DISPLAY SYSTEM
Filed June 13, 1966 7 Sheets-Sheet 1
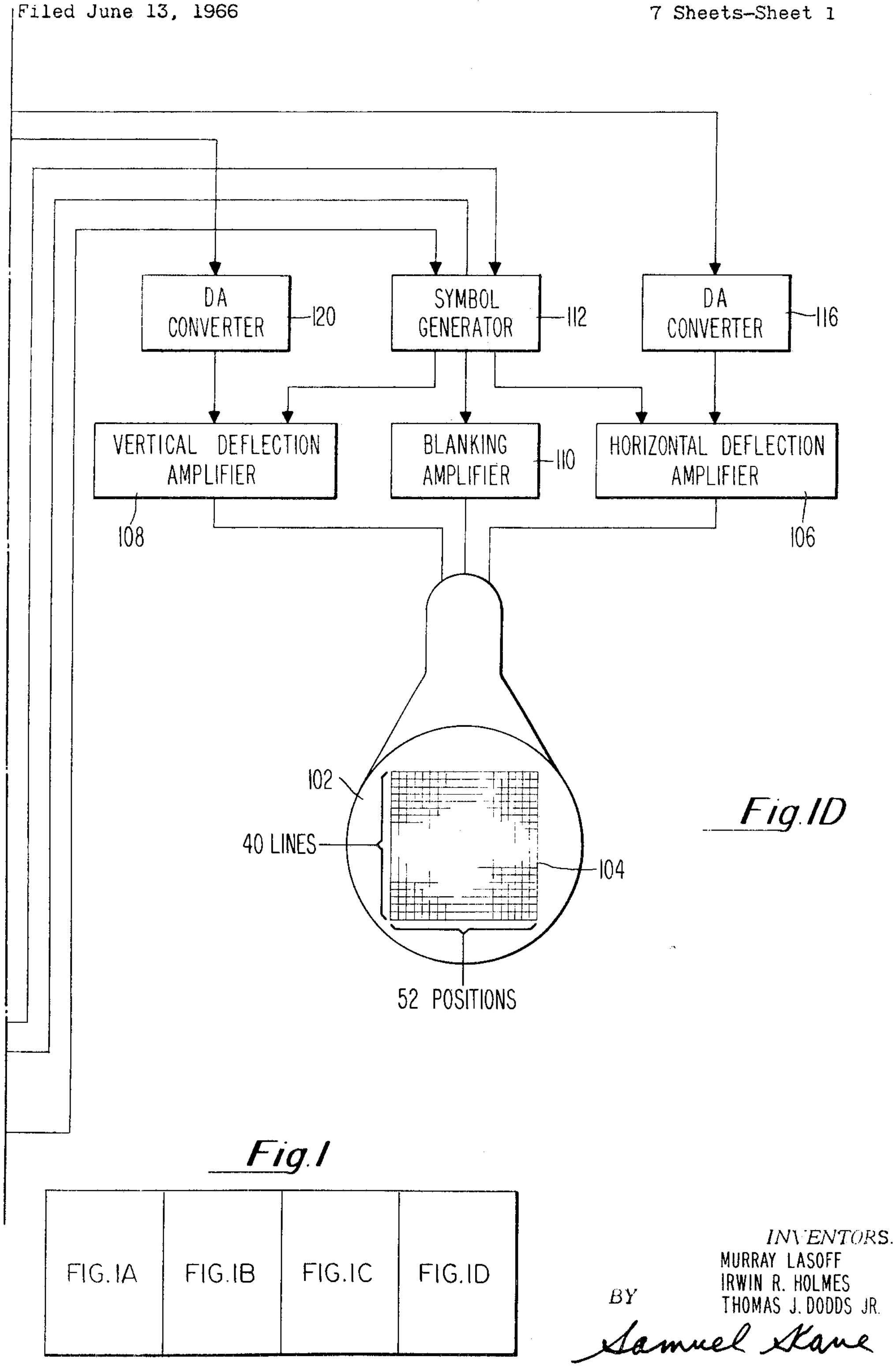
Fig. ID, Fig. I
INVENTORS.
MURRAY LASOFF
IRWIN R. HOLMES
THOMAS J. DODDS JR.
BY
Samuel Kane
ATTORNEY INVENTORS.
MURRAY LASOFF
IRWIN R. HOLMES
THOMAS J. DODDS JR.
BY Samuel Kane
ATTORNEY INVENTORS.
MURRAY LASOFF
IRWIN R. HOLMES
THOMAS J. DODDS JR.
BY Samuel Kane
ATTORNEY INVENTORS.
MURRAY LASOFF
IRWIN R. HOLMES
THOMAS J. DODDS JR.
BY Samuel Kane
ATTORNEY

| b6 b5 b4 \ b3 b2 b1 | 0 0 0 | 0 0 1 | 0 1 0 | 0 1 1 | 1 0 0 | 1 0 1 | 1 1 0 | 1 1 1 |
|---|---|---|---|---|---|---|---|---|
| 0 0 0 | 0 (ZERO) | 1 | 2 | 3 | 4 | 5 | 6 | 7 |
| 0 0 1 | 8 | 9 | ✳ | ; | $ | ( | = | ' (APOS) |
| 0 1 0 | (SPARE) | A | B | C | D | E | F | G |
| 0 1 1 | H | I | + | · | ) | ⊐ | FID | % |
| 1 0 0 | — | J | K | L | M | N | O | P |
| 1 0 1 | Q | R | EOF | CR | (SPARE) | [ | Δ EPF1 | ∇ EPF2 |
| 1 1 0 | SPACE | / | S | T | U | V | W | X |
| 1 1 1 | Y | Z | ≠ | , | (SPARE) | (SPARE) | " | DELETE |

Fig. 2 b6—MOST SIGNIFICANT BIT
CR—CARRIAGE RETURN
EPF1—END OF FIELD FOR QUERY FIELD
EPF2-END OF FIELD FOR QUERY FIELD-HARD COPY SELECTED
FID—FIELD IDENTIFIER
EOF—END OF FIELD, OTHER THAN QUERY FIELD

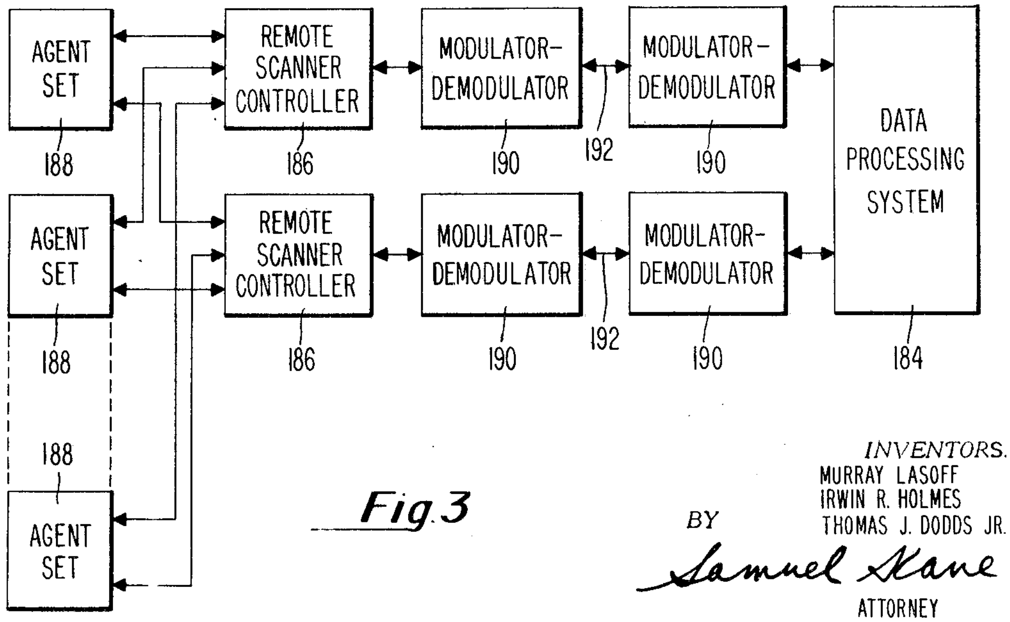

Fig. 3

INVENTORS.
MURRAY LASOFF
IRWIN R. HOLMES
THOMAS J. DODDS JR.
BY Samuel Kane
ATTORNEY INVENTORS.
MURRAY LASOFF
IRWIN R. HOLMES
THOMAS J. DODDS JR.
BY
Samuel Kane
ATTORNEY INVENTORS.
MURRAY LASOFF
IRWIN R. HOLMES
THOMAS J. DODDS JR.
BY
Samuel Kane
ATTORNEY 3,505,665
DISPLAY SYSTEM Murray Lasoff, Downingtown, Irwin R. Holmes, Drexel Hill, and Thomas J. Dodds, Jr., Folsom, Pa., assignors to Burroughs Corporation, Detroit, Mich., a corporation of Michigan Filed June 13, 1966, Ser. No. 557,194
Int. Cl. G09f *9/100;* H01j *31/16*
U.S. Cl. 340—324 10 Claims

ABSTRACT OF THE DISCLOSURE

A cathode ray tube display system having a keyboard input, its own memory and the capability of input/output communication with a digital computer is disclosed. The display is organized into fields of different information and with the fields arranged on the cathode ray tube screen in a predetermined rank regardless of the order in which they are entered into the system. The display may be corrected or otherwise edited without having to rewrite other parts of the display. The system is also capable of receiving a fast stream of character codes from the digital computer. The system handles the character codes received from the computer by loading them into its memory two at a time.

This invention relates generally to data handling systems, and more particularly to such systems wherein the data is converted to a perceptible form such as for visible presentation on the face or screen of a cathode ray tube. While not limited thereto, the invention finds special application as a display set for use by the employees or agents of airline companies in their reservation offices, and therefore the invention will be described hereinafter in connection with such use and referred to as an "agent set."

An object of the invention is to provide improvements in data handling systems.

More specifically, it is an object of this invention to provide improvements in data handling systems for display applications.

Another object of the invention is to provide a display system for presenting a visible display of symbols, usually in the form of alphanumeric characters, punctuation marks and other marks generally used in business correspondence.

Another object of the invention is to provide a system wherein data in the form of symbols are organized in a display in identified fields of information.

A further object of the invention is to provide a display system which may have a plurality of data input sources.

More specifically, it is an object of this invention to provide a display system which may have both keyboard and data processor inputs.

A further object of the invention is to provide a display system which is capable of both transmitting to and receiving data from a data processor.

Another object of the invention is to provide a display system wherein fields of information may be displayed in a predetermined sequence, regardless of the order in which the several fields of information are introduced into the system.

Another object of the invention is to provide a display system wherein displayed data may be corrected or otherwise edited without rewriting the entire display.

A further object of the invention is to provide a display system which reqiures a minimum number of registers and transfer paths for performing multiple functions.

More specifically, it is an object of this invention to provide such a display system in which certain of the registers and certain of the transfer paths are utilized in the performance of all of the above-mentioned multiple functions, thus resulting in the utilization of a minimum number of registers and transfer paths.

Still more specifically, it is an object of this invention to provide such a display system which may perform a display function, a keyboard load function and a data processor input function, and with the logic for these functions overlapping, so that unique sets of logic, each exclusively individual to one of these functions, are not required.

In accordance with the above objects and considered first in one of its broader aspects, the invention comprises a display medium having horizontal and vertical display positions and a storage device having a plurality of storage cells. One or more sources of input data may be provided and with means for changing the input data into groups of character codes. Each group of character codes contains data character codes and control character codes, and means is provided for loading the character codes of each group individually into a sequence of the storage cells. Each sequence of storage cells stores a different kind of input data.

A horizontal position means and a vertical position means are provided for establishing the horizontal and vertical display positions on the display medium, and a symbol generating means, which is responsive to certain of the character codes and to individual signals, is provided for generating and displaying visible symbols on the display medium in lines of symbols at symbol positions established by the horizontal position means and the vertical position means. A control means is provided, operable in a display cycle of the display system, for successively detecting a first control character code in a storage cell in each sequence of storage cells for actuating the horizontal position means and the vertical position means at each detection to establish the position on another line of the display medium to commence displaying symbols on that line.

The invention will be more clearly understood when the following description of the preferred embodiment thereof is read in conjunction with the accompanying drawings in which:

FIG. 1A, FIG. 1B, FIG. 1C and FIG. 1D, when placed together as shown in FIG. 1, which is on the same sheet with FIG. 1D, constitute a block diagram of a display system constructed in accordance with the invention;

FIG. 2 shows a tabulation of illustrative symbol or character codes, and other codes;

FIG. 3 is a block diagram of a communication system showing a plurality of agent sets connected to exchange data with a data processing system;

[redacted]

Figure 1A:
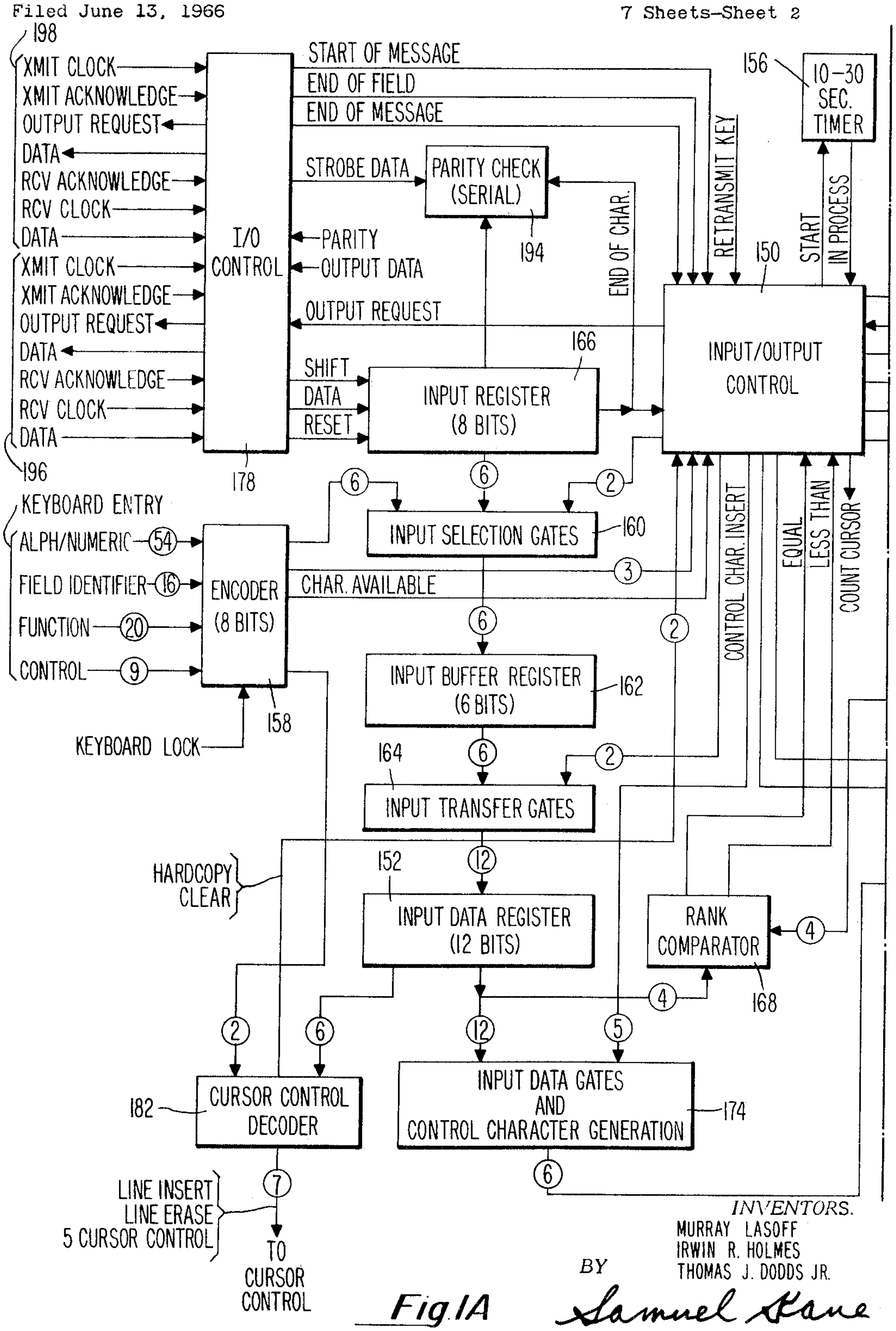
Figure 1B:
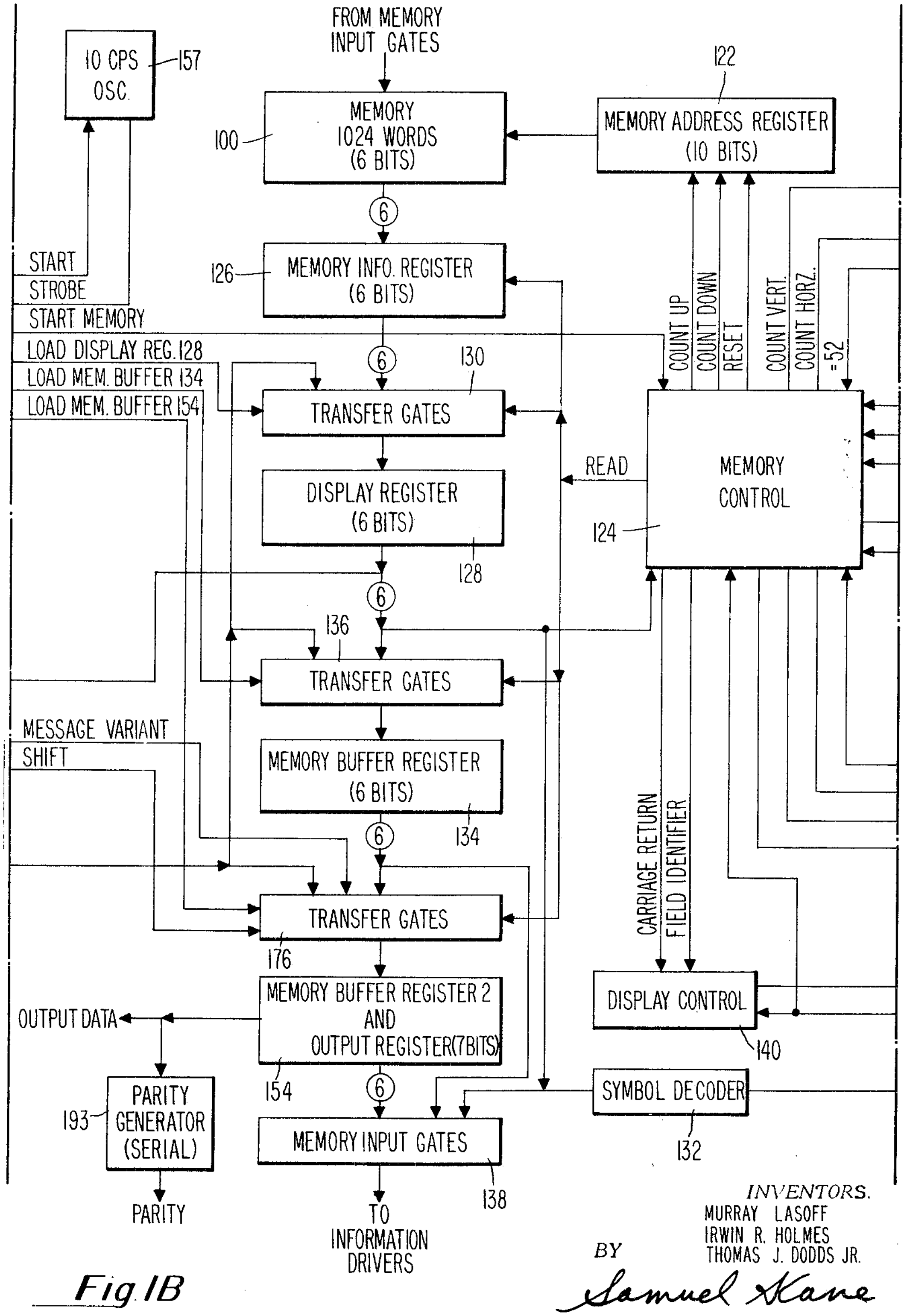
Figure 1C:
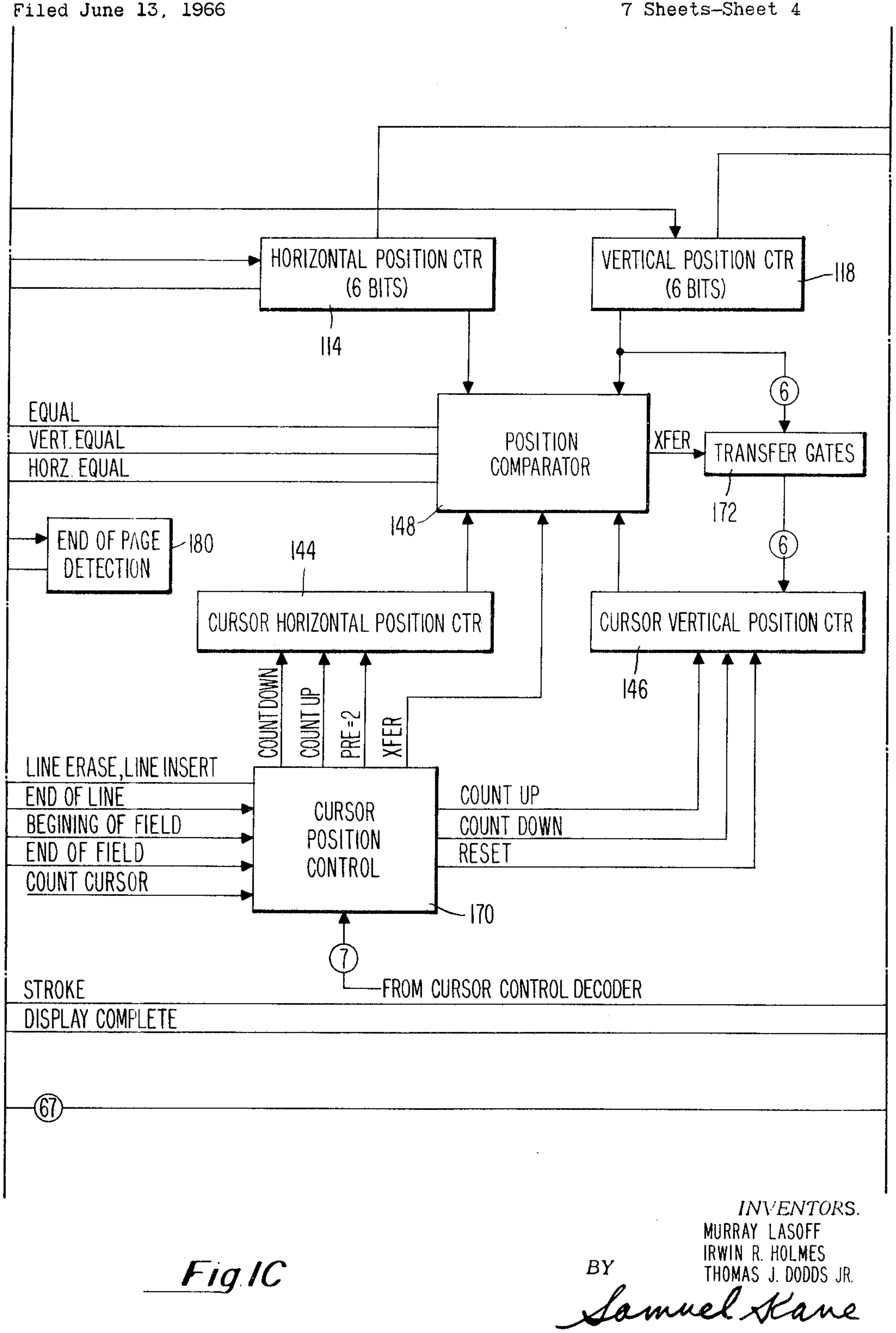

The invention is capable of erasing a line of characters. This may be accomplished by means of a line erase key. Depressing this key sets all data characters of the line that the cursor is positioned on to space codes, except those characters to the left of the cursor.

The invention is capable of creating a new line. For this purpose, a line insert key may be provided. Depressing this key causes the line that the cursor is positioned on, and all lines below, to be pushed down one line, thus creating a new line. The cursor is positioned to the first data character position of this new line. If the cursor was positioned to the first line of a field, the field identification in the margin is not pushed down.

Positioning the cursor to a particular field is accomplished by use of the field identifier keys. Once the cursor is within a field, agent set logic prevents the operator from leaving the field except by means of the field identifier keys. Further, the cursor cannot be positioned to the margin or to the two acknowledged Query fields.

The invention is capable of being operated so as to position the cursor to any position within a field, in case it is desired to edit or change the field in some way. Five keys are provided in this embodiment to position the cursor within a field; these are UP, DOWN, FORWARD, BACK, and TAB keys. The UP, FORWARD and BACK keys are two-level keys. Normal depression of the key causes a single action while further depression causes the action of normal depression to be repeated at the rate of approximately 10 actions per second.

Each depression of the UP key causes the cursor to be positioned to the first data position of the line above. The key has no effect when the cursor is positioned to the first line in a field.

Each depression of the DOWN key causes the cursor to be positioned to the first data character position of the line below. If the cursor is positioned to the last line of a field, all information below is moved down one line to create a new line. The cursor is positioned to the first data position of this new line.

The cursor moves to the right one position for each depression of the FORWARD key. When the cursor is positioned to the last character of the line, the cursor is moved to the first data position of the next line down, unless it is the last line of the field. In that case, the cursor remains on the last character of the field.

The cursor moves to the left one position for each depression of the BACK key, except when the cursor is in the first data character position. In that case, the key operates as described for the UP cursor positioning key.

Depressing the TAB key causes the cursor to move to the last character in the field.

The invention is also capable of specifying a hard copy output. For this purpose, a HARD COPY key is provided in order to allow the agent to specify to the processor a hard copy response for certain Querys. Depressing the HARD COPY key automatically replaces the delta in the initial state Query field with an inverted delta.

Depressing a CLEAR key clears the agent set memory and causes an initial state Query field identifier to be written in the margin of the top line of the screen. The delta appears in the first data character position. The cursor is positioned over the delta.

A number of function keys, in this case twenty, are provided by the agent set. Each of these keys denotes a specific action to be taken by the data processor. Depressing a function key causes a corresponding letter/symbol to be written at the position of the delta in the initial state Query field. The delta is moved one position right except if it is in the 50th data position. In that case, the delta is moved to the first data position of the line below, creating a new line and acknowledged Query fields are pushed one line down. Depressing of a function key also causes transmission. Table III lists the twenty illustrative function keys and their letter assignment.

TABLE III

Function keys

| Function key | Letter/symbol assignment |
|---|---|
| Ignore | I |
| Cancel | X |
| Queue | Q |
| End PNR | R |
| Redisplay PNR | D |
| Retrieve PNR | P |
| Seat Map | M |
| Stat Counts | C |
| Transmit | T |
| Availability | A |
| Flifo | F |
| Flt. Seg. Action | + |
| List | E |
| Schedule | K |
| Sell TW | S |
| Partial PNR | — |
| Space | V |
| Spare | W |
| Spare | Y |
| Spare | Z |

As indicated previously, the agent set is capable of communicating and exchanging data with a data processing system. For this purpose, the agent set connects to the data processing system or processor, by interfacing independently with one or more, in this case two, remote scanner controllers. The agent set is capable of transmitting and receiving data from either remote scanner controller. During the transfer of data in either direction, the cathode ray tube screen is blank for the duration of the transfer. Briefly, one mode of data exchange with the system may occur as follows.

When a function key is depressed, a request for service is generated to both remote scanner controllers. When one remote scanner controller grants service, the agent set removes its request for service to the other remote scanner controller.

Upon completion of message transmission to the remote scanner controller that granted service, the agent set is placed in the receive mode and awaits a response from either remote scanner controller. Upon completion of the response, the agent set is returned to operator control.

FIG. 2 illustrates a 6-bit character code set for communication from and to the agent set. Use of the character codes is discussed in the following paragraphs.

Each message from the agent set begins with a standard five character header:

| | | |
|---|---|---|
| Character **1** | SOM | Start of Message |
| Character **2** | ID1 } | Remote Scanner Controller/ |
| Character **3** | ID2 } | Agent Set Address |
| Character **4** | MV | Message Variant |
| Character **5** | FC | Function Code |

SOM, ID1 and ID2 are generated by the remote scanner controller and MV and FC are generated by the agent set.

The message variant character MV is a character used to describe three possible variants for a message. The three most significant bits $b_6$, $b_5$ and $b_4$ of the character will always be set to ZERO. When the $b_3$ bit is set to the ONE state it indicates that hard copy is requested. It is set to the ONE state whenever the HARD COPY key is depressed. It is reset to the ZERO state by any processor response. When the $b_2$ bit is set to ONE it indicates that the message is a retransmission. It is reset to ZERO by any processor response. When the $b_1$ bit is set to ONE it indicates that the agent set had been cleared by the operator. It is set to ONE whenever the CLEAR key is depressed. It is reset to ZERO by any processor response.

The function code FC defines which of the function keys has been depressed. The content of this code or character will correspond to the letter for the function. For example, the Availability function (Table III) is denoted by the letter "A." Then the function code FC for Availability is 010001 which corresponds to the letter code for "A" shown in FIG. 2.

Following the standard five-character header, all fields that are in the initial state are transmitted, except that if the Ignore or Redisplay function keys were used to cause transmission, only the message variant MV and the function code FC are transmitted.

Each field is transmitted starting with field identification. Field identification is established by a two-character sequence. The first of these is always the field identifier code FID (FIG. 2). The least four bits of the next character (rank character) carry the binary value of the rank (Table I), and thereby define the field. For example, the field identifier code FID followed by 001001 indicates the J field (rank 9). Following field identification, the data characters for the field follow in typewriter order. A carriage return code CR (FIG. 2) is sent at the end of each line except if the line contains 50 data characters, or it is the last line of the field. If the last line of a field contains 50 data characters, an additional blank line exists at the end of the field.

Following the transmission of the last character in the initial state Query field, the agent set signals the remote scanner controller to send an end-of-message code as the final character in the message. In the case where the Ignore or Redisplay function keys were used to cause transmission, the end-of-message code is sent following the five-character header. The agent set adds a parity bit to each character it transmits.

Following transmission, the agent set is switched to the receive mode and awaits a processor response. While awaiting a response, the screen displays the contents of the memory. If no response for a message is received within a preset time, the agent set will automatically retransmit the message once. The fact that this may be a duplicate message for the processor is indicated by setting the $b_2$ bit in the message variant MV character to ONE. If no response is received to the retransmitted message (after the preset time again elapses), a Time Out indicator will be lit. Further retransmissions are then under operator control via a RETRANSMIT key. This key is only active when the Time Out indicator is illuminated. Depressing the key extinguishes the indicator, the message is retransmitted, and the agent set again waits for the preset time period for a response. The timer is started when the agent set completes its transmission to the remote scanner controller.

Two codes are used to indicate to the processor the occurrence of parity errors in transmission to the processor. When a parity error is detected by the remote scanner controller in data from the agent set, it substitutes a parity error character PE1 for the character in error. If a data buffer module, at the processor, detects a parity error in the incoming message, it substitutes a parity error character PE2 for the character in error.

When the remote scanner controller starts to send the response message, the screen goes blank for the duration of the message. Each message from the processor starts with a standard three-character header.

| | | |
|---|---|---|
| Character **1** | SOM | Start of Message |
| Character **2** | ID1 | Remote Scanner Controller/ |
| Character **3** | ID2 | Agent Set Address |

Following the three-character header are the fields. Each field consists of field identification and the characters of the field. Field identification is established by the two-character sequence field identifier code or character FID followed by a rank character. The characters for the field are sent in typewriter order. A carriage return code CR is sent at the end of each line except if the line contains 50 data characters, or the line is to be the last line of the field. When the final line in a field contains 50 data characters, the agent set creates an additional blank line at the end of the field.

In the event tht a field does not exist within the agent set, the new field is inserted in its appropriate position. Received fields corresponding to existing fields overwrite the corresponding field, except in the case of a received Query field. The processor may send a larger size field than an existing corresponding field. However, to exactly overwrite an existing field, the processor must send the same number of characters for the field as the agent set sent for the corresponding field.

In the event an existing field has been established by the processor and the agent has not modified the field; then to exactly overwrite this existing field, the processor sends the same number of characters for the field as was sent when it established the field.

Receipt of field identification always sets the field to the acknowledged state. The instance of receiving just a field identification as a message element (a message element ends when either the next identification or an end-of-message character is sent) only acknowledges the corresponding existing field.

The receipt of Query field identification is handled in a somewhat different manner. The entry is positioned to the first data position of the line beneath the display of the delta of the initial state Query field. The data on this line and subsequent lines is pushed down one line to make room for the Query field response. The Query field data is then inserted in this new line. When more than one line is required, additional lines are provided by pushing down the information below.

The occurrence of an end-of-message code causes a new Query field identifier to be written one extra line below all other fields and above previous Query fields. The cursor is positioned to the first data character position of this new Query field. The end-of-message character also acknowledges the previous Query field, removes any acknowledged Query field beyond the two most recent, and activates the keyboard.

The data processor may clear the entire agent set memory by means of a special code. This code is transmitted by the two-character sequence, field identifier character FID followed by 011111. This code represents a value beyond the rank of any field. This sequence is sent at the beginning of the message when it is desired to clear the entire agent set memory. An initial state Query field idenifier is written at the top of the screen as a part of the clearing action to provide a reference for subsequent Query field information in the message.

In the event that a parity error is detected in the incoming message, or a field identifier character FID does not follow the header, the agent set will light a Receive Error indicator advising the agent of this occurrence, and will simulate the occurrence of end of message. Further, the Incoming Error light will also be lit when the incoming message has caused the capacity of the agent set to be exceeded such that a new initial state Query field identifier is not entered at end of message. The indicator is extinguished upon the next transmission.

The agent set is also capable of detecting the end of a page. For indicating the occurrence of this event, the agent set may be equipped with an End of Page warning light. Upon the detection of the end of a page in the present illustrative embodiment, the controls which normally allow insertion of data are inhibited, except the field identifier key for the Query field, and message compositions are limited to adding characters in this field.

A signal, preferably in the form of a light, may be provided which will indicate, by being lit in this case, if any existing field other than the Query field is in the initial state, and therefore has not been transmitted to the data processor.

DETAILED DESCRIPTION

Turning now to a detailed description of the invention, the illustrated embodiment employs a display medium for visibly displaying the contents of a 1024-word six-bit coincident current magnetic core memory 100 in a 40-line by 52-position presentation (FIG. 1D). The display medium is preferably in the form of a cathode ray tube 102. Beginning from the left of the cathode ray tube screen 104, the first two positions (FIG. 4A) in a line are margin positions 1 and 2, which are further identified by the reference characters MP–1 and MP–2, respectively. The next 50 positions in the line are data positions DP–1 to DP–50.

The particular cathode ray tube 102 in this embodiment is provided with an electromagnetic deflection system which receives signals from a horizontal deflection amplifier 106 coupled to the horizontal yoke portion of the deflection system, and a vertical deflection amplifier 108 coupled to the vertical yoke portion of the deflection system for positioning the cathode ray tube electron beam to generate the display on the face of the screen 104. The electron beam will illuminate the screen 104 by displaying the various symbols and characters whenever it is unblanked by a blanking amplifier 110 which is actuated by a symbol generator 112. The symbol generator 112 may take various forms, however, illustrative types are individually described and claimed in a copending application of Gilbert Yanishevsky entitled "Resistor Matrix Symbol Generator," filed May 27, 1966, and in another copending application of Jonathan E. Stine entitled "Multilevel Blanking Control and Momentary Stroke Inhibition for Visual Display Apparatus" filed May 27, 1966, both applications being assigned to the same assignee as the present invention.

A horizontal position counter 114 is a six-bit up counter which is used to obtain the horizontal positions of the display on the cathode ray tube. The counter 114 is connected to a horizontal digital-to-analog converter 116 and provides 52 states so that the horizontal digital-to-analog converter which is connected to the horizontal deflection amplifier 106 can establish the 52 positions for left-to-right positioning.

A vertical position counter 118 is also a six-bit up counter and is used to obtain the vertical position of the display on the cathode ray tube. The counter 118 is similarly connected to a vertical digital-to-analog converter 120 and provides 40 states so that the vertical digital-to-analog converter 120, which is coupled to the vertical deflection amplifier 108, provides 40 positions for top-to-bottom positioning of the cathode ray tube electron beam.

The horizontal and vertical positioning of the electron beam by the counters 114 and 118 serves to position the beam to a reference point at each of the positions on the screen 104, so that the symbol generator 112 can use these points as reference points for generating the stroke-type symbols. The method of generating these symbols is described in detail in the above-mentioned copending applications, and need not be elaborated upon any further here.

A memory address register 122 consists of a ten-bit counter which provides the address for reading and writing the character codes of the memory 100. Data is stored in the memory 100 in display order sequence, which then referenced to the screen 104 is from left to right and from top line to bottom line, and with the data stored in the memory 100 in consecutive memory locations.

The display cycle is preferably synchronized with the line frequency (60 cycles per second) so that the content of the memory 100 is displayed in less than 1/60 of a second. A start pulse signals the beginning of a 60-cycle period and the commencement of the first display cycle.

Each display cycle begins by the application of timing signals from a memory control unit 124 to return or reset the memory address register 122, the horizontal position counter 114 and the vertical position counter 118 to their first position. The memory control unit 124 is a counter which consists of a 9-bit serial shift register which is cyclic, and with the 10th bit in the register being implemented by means of a gate which detects the fact that all nine stages in the register are in the ZERO state. This construction serves to provide a 10 "$t$" time memory cycle, and these 10 "$t$" times are used as timing and control signals. The read and write pulse generation to the memory read and write drivers is generated under control of the "$t$" time counter within the memory control unit 124.

Each character code in the memory 100 is read into a memory information register 126 and transferred into a display register 128 via a set of two-by-two transfer gates 130. The memory information register 126 consists of a six-bit register used for storing information from the memory 100 during the loading function, which will be described later, however, in the display mode the memory information register 126 presents a small delay in a high speed transfer from the memory 100 to the display register 128.

The display register 128 consists of a six-bit register used to store the information transferred from the memory information register 126 and to present the information to a symbol decoder 132, each of whose output lines can provide a signal to the symbol generator 112 for generating a particular symbol. The display register 128 is capable of transferring to either a memory buffer register 134 through a set of transfer gates 136 or through memory input gates 138 to the memory 100 via the memory information drivers.

The symbol decoder 132 decodes the six bits of information that are presented to it from the display register 128. These six bits are equally divided into two sets of three bits. Each set of three bits is decoded into its full eight bit decode. The decodes are fed into an 8 x 8 matrix which has been expanded to a size 8 x 10. Thus 80 outputs could be obtained from the symbol decoder 132, but since the 16 assigned letters for the field identifiers (Table I) have the same display as the 16 data characters A–P (FIG. 2), the 32 outputs corresponding to these characters are ORed to 16 outputs, thereby providing a total decoded output of 64 characters from the symbol decoder 132. Three additional output lines from the symbol decoder 132 which pass through the symbol decoder 132, but are not the result of decoding thereby, conduct unique signals to the symbol generator 112 to initiate the generation and display of the cursor 142, an upwardly extending arrow 143 which signifies an unacknowledged field, and a dot 145 which signifies an acknowledged field. Thus the output of the symbol decoder 132 which is coupled to the symbol generator 112 consists of 64 decoded lines and the three unique lines.

Returning to the character code which was read out of the memory 100 and transferred into the display register 128, this character code is now detected in the display register and if it is an alphanumeric character it is transmitted to the symbol generator 112 via the symbol decoder 132. Upon the application of a stroke signal to the symbol generator 112 from a display control unit 140, generator and display of the character on the cathode ray tube screen 104 will take place. Upon the occurrence of the write cycle, the character in the display register 128 is written back into its location in memory 100 via the memory input gates 138. The display control 140 consists of the necessary timing flip-flops for generating the 1.2 microsecond stroke pulses for generating the displays. The display control 140 also generates the start pulse, or stroke pulse, which is applied to the symbol generator 112 to initiate the start of symbol generation. When the symbol display has been completed, a signal is generated by the symbol generator 112 and applied to the display control unit 140 to terminate the display function, and to signify to the memory control 124, by the same signal, that a new character may be displayed.

The memory address register 122 and the horizontal position counter 114 are counted up by one count, unless the character is at the last data position of the screen, DP–50, in which case the horizontal position counter 114 is reset back to data position DP–1, the vertical position counter 118 is counted up one by count to the next line below and the memory address register 122 is counted up by one count to present the next address to the memory 100.

Certain of the control characters for performing carriage return type of functions are displayed, and others are not. For example, the carriage return character CR and the end-of-field character for any field except a Query field are not displayed. However, the end-of-field character EPF–1 for a Query field is displayed on the screen in the form of a detla 147 (FIG. 4A) and the end-of-field character EPF–2 for the Query field indicating that the hard copy option was selected is displayed as an inverted delta 149. In all cases, however, whether the control characters are displayed or not, they are presented to the symbol generator 112, in order that the system may compensate for the fly-back time on the cathode ray tube display. A stroke counter in the symbol generator 112, which is running with the symbol generator, detects the carriage return type of code and delays the end-of-character signal long enough so that enough time is provided for this full screen deflection of the cathode beam.

If the control character out of memory in the display register 128 is the carriage return code CR or the end-of-field code EOF, these characters are not displayed, as indicated previously, but are written back into their locations in the memory 100, and the horizontal position counter 114 is reset to data position DP–1 and the vertical position counter 118 and memory address register 122 are counted up by one count. If the control character out of memory is one of the end-of-field characters EPF–1 or EPF–2 for the Query field, these are transferred to the symbol generator 112 for display of the appropriate delta, and then written back into their locations in the memory 100 and their display cycles terminated. In this case also, the horizontal position counter 114 is reset to data position DP–1 and the vertical position counter 118 and memory address register 122 are similarly counted up by one count to start the next display cycle.

As mentioned earlier, field identification is established by a two-character sequence, the FID code followed by the rank character. Since the FID character is always the first character to establish a new field, it will always follow an end-of-field character, and will always be the first character read out of the first address or memory cell in the memory 100. Thus when the complete memory has been cycled once in the display mode, as indicated by the memory address register 122, this register will be reset to its first position by the memory control 124 so that the first character read out of the first memory cell will be an FID character. The 1024 words or cells in the memory 100 may be further identified by the reference characters M–1 to M–1024.

Now when the FID character is read out and detected in the display register 128, it is not displayed on the screen 104 since it is not a displayable character, but is written back into memory. However, while in the display register 128, the FID character is detected, and this will indicate that the next character out of memory will be a rank character whose assigned letter (Table I) is to be displayed on the screen at margin position MP–1. Accordingly, during the time that the next, or rank, character is being read out and transferred into the display register 128, the horizontal position counter 114, which had been reset to data position DP–1 on the previous display cycle, will now be down-counted by two counts to place it at margin position MP–1. At the termination of the memory cycle for the FID character, the memory address register 122 will have been counted up by one count to present the next address to the memory 100, this being the address for the rank character which follows the FID code.

Figure 4A:
FIGS. 4A–4H and 4J illustrate various examples of displays which the illustrated embodiment of the invention can present to a display medium, such as a cathode ray tube.
Figure 4B:
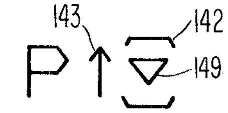
Figure 4C:
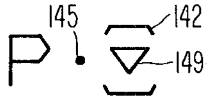

When the rank character is read out of the memory 100 and transferred into the display register 128, the least significant four bits of this character, $b_4$, $b_3$, $b_2$ and $b_1$, will be decoded in the symbol decoder 132 so that the assigned letter for the particular rank will be displayed on the screen at margin position MP–1. This is illustrated in FIG. 4A, for example, by the letter "P" which indicates that this is a Query field. However, when the display cycle for the rank character display is complete, as will be indicated by a signal from the symbol generator 112 to the display control 140, the memory address register 122 will not be counted up at this time, but the horizontal position counter 114 will be counted up by one count. The reason for this is that the fifth bit $b_5$ of the rank character which is still in the display register 128 is used for decoding the fact of whether the field has been acknowledged or not. Thus, in the next display cycle, while the rank character is still in the display register 128, it will be decoded in the symbol decoder 132 and if its fifth bit $b_5$ is set to the ONE state, indicating that the field has been acknowledged, the dot 145 (FIG. 4C) will be displayed at margin position MP–2 following the display of the rank character letter. If this fifth bit $b_5$ is in the ZERO state, indicating that the field has not been acknowledged, the upwardly pointing arrow 143 (FIG. 4A) will be displayed at this second margin position MP–2.

Figure 4D:
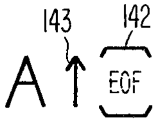

The next character out of memory following the rank character in a display cycle will be an end-of-field character, such as EOF or EPF–1, in the case where no data has as yet been entered into the particular field. Such a field is illustrated in FIG. 4D with the end-of-field character EOF shown dotted to illustrate the fact that this particular character is not being displayed on the screen. When data is entered into a field, as indicated in the upper line in FIG. 4G, for example, the end-of-field character EOF will be stepped rightwardly in typewriter fashion and the cursor marker 142 will move along with it.

Still with reference to the display function, we now come to a consideration of the method in which the cursor marker 142 is displayed during the display mode of operation.

The cursor 142 in this embodiment is illustratively a two-part marker which is not contained in memory, but which is written on the screen 104 in the same position as an existing character. The existing character may be a carriage return character CR, and end-of-field character EOF or EPF–1 or EPF–2, or it may also be a data character, as will appear more clearly hereinafter when the use of the cursor 142 is discussed when performing the various editing functions.

Since the cursor 142 is always positioned over a character, whether it is a displayable character or not, two display cycles must be performed in the same character position. In the present embodiment of the invention, it has been chosen to first display the cursor 142 in one display cycle and then subject the character that is at the same position to another display cycle.

Now, in connection with displaying the cursor 142 there are provided a cursor horizontal position counter 144, a cursor vertical position counter 146 and a position comparator 148.

The cursor horizontal position counter 144 is a standard six-bit up-down counter capable of counting by either one count or two counts. During the display function or when the system is in the keyboard loading mode, the cursor horizontal position counter 144 counts by one count. However, when the system is receiving data from the data processor and is processing a two-character input from the data processor, the cursor horizontal position counter counts by two counts.

The cursor vertical position 146 is also a six-bit up-down counter, however, this counter is only capable of counting by one count. The position comparator 148 is a standard 12-bit comparator which compares the count or state of the horizontal position counter 114 with that of the cursor horizontal position counter 144, and similarly compares the count or state of the vertical position counter 118 with the count or state of the cursor vertical position counter 146. If the position comparator 148 finds that the horizontal counters 114 and 144 are equal, or that the vertical counters 118 and 146 are equal, or that both horizontal and vertical counters are equal, it provides corresponding outputs to the memory control 124. In the present discussion of the display mode in connection with the display of the cursor 142, the output of the position comparator 148 which indicates that both the horizontal and vertical position counters are equal is the output of interest. The other outputs of the position comparator 148 will be discussed later on in connection with the cursor positioning function, since they are applied to the memory control 124 for initiating the various transfers of the cursor 142 to different positions on the screen 104, and for the determination of the count pulses to be transmitted to the cursor counters 144 and 146 in connection with such transfers.

Each time a display cycle is started the output of the position comparator 148 is detected to determine whether the horizontal position counters 144 annnd 144 are equal, or whether the vertical position counters 118 and 146 are equal, or whether both the horizontal and vertical counters are equal. If the output of the position comparator 148 indicates that both the horizontal and vertical position counters are equal, this indicates that the character which was read out of memory into the display register 128 is at the same position as the cursor 142, which indicates that two display cycles must be performed at the same character position.

As indicated previously, the cursor 142 is displayed first. This is accomplished by a signal from the memory control 124 which is sent to the symbol generator 112 via the symbol decoder 132 for displaying the symbol of the cursor 142. This signal to initiate cursor display is conducted to the symbol generator 112 over one of the three unique lines forming one of the sixty-seven outputs of the symbol decoder 132, discussed previously. The line from the memory control 124 for conducting this signal to the symbol decoder 132 is not shown on the drawing.

After the display of the cursor 142 is complete, the display cycle is terminated in the usual manner by an output signal from the symbol generator 112 to the display control 140. However, in initiating the next display cycle, the memory address register 122 and the horizontal position counter 114 are not counted up, since the same character in the display register 128 must again be subjected to a display cycle. This character is now transferred to the symbol generator 112 and displayed in the established manner, if it is displayable, at the same character position as the cursor 142. Therefore, the cursor 142 will always bracket some character on the screen display, whether or not the character is a displayable one.

Information to be displayed on the cathode ray tube screen 104 may be loaded into the memory from either a keyboard or data processor. The description will now be directed to the keyboard mode of loading and the data processor mode will be described later on.

It will now be assumed that the agent set has been turned on by the operator by depressing a POWER ON CLEAR key. This serves to clear all information out of the memory 100 and upon the completion of the CLEAR cycle an initial Query field will be automatically written into the first three memory cells M–1 to M–3. The display cycle is free-running, that is it keeps repeating over and over, however, during the loading cycle there is no display presented to the cathode ray tube screen. However, whenever the display is presented durng the display cycle, the initial Query field which was described as just being loaded into the memory, will be presented in a display on the screen in which the letter "P" will be displayed in margin position MP–1, the upwardly extending arrow 143 will be displayed in margin position MP–2, indicating that this field has not as yet been acknowledged, and an end-of-field character EPF–1 for the query field will be displayed in the firt data position DP–1 in the form of the delta 147. Depression of the POWER ON CLEAR key also places the cursor 142 over the delta 147 so that it too is displayed at the same position as the delta.

The logic used in the illustrative agent set is such that the initial Query field will always appear at the top of the screen 104 whenever the POWER ON CLEAR key is depressed or as will appear later on, whenever the CLEAR key is depressed. The manner in which this occurs will be described later, since it is considered more convenient at this time to describe the loading of information into the memory 100 for a field other than the Query field.

The first information to be entered into the system is a field identifier according to the type of information that is to be entered. This is accomplished by the operator by depressing the appropriate one of the 16 field identifier keys. As discussed earlier, the field identifier is a two-character sequence, the first character being the rank character. The field identifier code FID is detected by an input/output control unit 150 and stored therein for the time being. The input/output control 150 consists of a series of control flip-flops used to generate timing pulses, transfer pulses and shift pulses necessary to transfer data from an input data register 152 into the display register 128, the memory buffer register 134, and another memory buffer register 154, as will appear more clearly hereinafter. The input/output control 150 also controls a retransmission timer 156, and also controls the start times and a 10 cycle per second oscillator 157 which is used in connection with the cursor 142 control switches, as will be described later on. The input/output control 150 also generates the control signals for starting the memory 100 and the count pulses for controlling the cursor 142 movements.

The second field identifier character, which is the rank character, is encoded in an 8-bit encoder 158 in the form of a counter used to generate the character codes for the four types of keyboard inputs, (1) alphanumeric keyboard keys, (2) field identifier keys, (3) function keys, and (4) cursor control keys. When the counter in the encoder 158 reaches a particular count corresponding to the key depressed, the counter will stop at this point. The counter provides 256 possibilities divided into four discrete segments, or 64 possibilities in each segment. These 64 possibilities correspond to a 6-bit output of the encoder 158 and the determination of which one of the four inputs the 6-bit output corresponds to is determined by the four possibilities of the other two control bits in the output of the encoder 158.

The encoded rank character is transferred to the input data register 152 via six two-by-two input selection gates 160, a 6-bit input buffer register 162 and a set of input transfer gates 164. The input selection gates 160 are used for strobing information from an input register 166 when the agent set is in the receive mode, as will be described later, or in the case under discussion from the encoder 158 into the input buffer register 162, which stores the information until the proper time to transfer it into the input data register 152. The input data register 152 is a 12-bit register which consists of two 6-bit registers and therefore is capable of storing two characters. The reason for the two-character construction of the input data register 152 is that at certain times when loading from the data processor two characters at a time must be processed by the agent set due to the differences in timing at certain points in the loading operation. However, in the keyboard mode presently under discussion a single character is loaded at a time.

The two 6-bit registers in the input data register 152 may be further identified by the reference characters CP–1 and CP–2 to indicate character position one and character position two, respectively. To simplify the control in the keyboard mode, it is desirable that all the decodes be made from the same register, therefore all data which is transferred to the input data register 152 when loading in the keyboard mode will be stored in character position CP–1.

The input transfer gates 164 gate the transfer of information from the input buffer register 162 to either the first character position CP–1 of the input data register 152 or the second character position CP–2 of the input data register according to control signals received from the input/output control 150. As indicated previously, when the agent set is in the keyboard mode, the information from the input buffer register 162 will be gated exclusively to the first character position CP–1 in the input data register 152.

Accordingly, the encoded rank character which was transferred into the input data register 152 is now stored in the first character position CP–1.

As indicated previously, the first characters in a new field consist of the field identifier character FID and the rank character, and these two characters are followed by the end-of-field character. These three character codes are loaded into the memory 100 in the order named and will appear sequentially in the memory cells, so that according to this sequence the field identifier character FID should be loaded into the memory 100 first.

The system must now search the memory 100 in order to determine where the field identifier information for the new field is to be inserted. During this search the display cycle is running, however, as indicated previously, no information is presented to the cathode ray tube during the performance of the loading function, so that there is no display at this time.

The logic of the system is such that prior to each display cycle, the system determines the type of search that will be required to load the data into its proper place in the memory 100. In this instance, the search will be for the rank character of a field which is stored in memory, in order to determine whether the incoming data is to be inserted before the existing field in memory, or whether there is an existing field in memory which is the same type of field as the input field which is going to be loaded. This is necessary because, as indicated previously, the various fields of information have been chosen to be displayed on the cathode ray tube screen 104 in a predetermined order or rank, as listed in Table I. Thus if the Query field happens to be the only field in memory, for example, and this field has the highest rank (rank 15), a subsequent field, for example, the Phone Number field having a lower rank (rank 8) would be inserted in front of it in memory, so that when a display is presented to the cathode ray tube, the Phone Number field information will appear on the cathode ray tube screen 104 and the Query field information would appear on the screen below it. This is illustrated in FIGS. 4F and 4G in which the Phone Number field (I) is occupying the line on the screen 104 which was previously occupied by the Query field (P). Thus entry of the Phone Number field serves to push the Query field down on the screen. A similar illustration is given in FIG. 4J in which a Flight Segment field has been inserted between a lower-rank Passenger Name field and a higher-rank Auxiliary Service field of FIG. 4H by pushing the Auxiliary Service field down one line on the screen 104.

Now in the process of searching for the rank character, as each display cycle commences, a character is read out of the memory 100 into the memory information register 126 and transferred into the display register 128 via the transfer gates 130. The rank character now in the display register 128 is compared with the input rank character of a new field identifier which is stored in character position CP–1 in the input data register 152 by means of a rank comparator 168. The rank comparator 168 is composed of a four-bit comparator and a four-bit subtractor whose sum output is not generated. The comparator is used to determine equality, and the carry for the four-bit subtractor is used to determine the "less than" status between the input data register 152 and the display register 128. If the rank comparator 168 indicates that the binary value of the four least significant bits of the input rank character in the input data register 152 is less than the same bits of the rank character in the display register 128, this indicates that the input rank characater has a lower rank on the list of ranks than the rank character in the display register, and should be loaded into the memory in front of it. If the rank comparator 168 indicates that the first four bits of the input rank character are equal in binary value to the rank character in the display register, this indicates that the field in memory is the same type of field as the field to be loaded, and that the information in the existing field should be overwritten and replaced with the information contained in the new incoming field.

If the rank of the input data in the input data register 152 is lower (lower binary value) than the data in the display register 128, then the input data must be placed in front of the data in the display register in order to achieve the insertion described above. This is accomplished as follows.

With the existing rank character in the display register 128, the field identifier code FID which was in front of it in memory will at this point have been written back into its memory location on the write portion of the previous cycle. At this point the display cycle is stopped by the memory control 124. The next step at this time to insert new data is to write the existing rank character back into memory from the display register 128 via the memory input gates 138 and information drivers and on the next memory cycle count down the memory address register 122 by one count to present the address to the field identifier code FID. At this time, the horizontal position counter 114 and the vertical position counter 118 will be in a state corresponding to the position of the field identifier FID which is going to be replaced in memory. Since the field identifier always introduces a new field, the cursor 142 will be positioned to the first data position of the field DP–1.

Positioning of the cursor 142 at this time is accomplished by a timing signal from the memory control 124 to a cursor position control 170 indicating the beginning of a field, in which case the cursor position control 170 will send a control signal to the cursor horizontal position counter 144 causing it to be preset to a state corresponding to data position DP–1, and will also send a transfer signal to a set of transfer gates 172 via the position comparator 148 to cause the state or count of the vertical position counter 118 to be transferred into the cursor vertical position counter 146. Thus, when a display can be presented to the cathode ray tube screen 104, the position comparator 148 will provide an output signal to the memory control 124 indicating that the horizontal position counters are equal and the vertical position counters are equal so that the cursor 142 will be displayed at data position DP–1 on the screen.

The cursor position control 170 consists of the necessary flip-flops for detecting the decoded output from a cursor control decoder 182 and for providing the necessary storage for controlling the various movements of the cursor 142. The signals fed into the cursor position control 170 are the End of Line, Beginning of Field, End of Field and Count Cursor pulses. The cursor position control 170 is used to generate the up and down count pulses and the preset pulses to the cursor horizontal position counter 144 and the cursor vertical position counter 146. The cursor position control 170 also generates the signals which cause carriage returns to be inserted into the memory 100 for a line insert key and cursor DOWN key, to be described later.

Returning again to the operation where the input data is to be inserted in front of the existing field, the memory address register 122 has been counted down, as indicated previously, so that at the beginning of the memory cycle the field identifier character FID is now transferred from the memory 100 into the memory information register 126. The input data in the input data register 152 is transferred into the memory buffer register 134 via a series of six gates in a block 174 entitled "Input Data Gates and Control Character Generation," and the transfer gates 136. The input data gates in block 174 are capable of transferring from either the first character position CP–1 or the second character CP–2 of the input data register 152. The input data gates in the block 174 are capable of transferring under the control of the input/output control 150 into either the memory buffer register 154, the memory buffer register 134 or the display register 128. The "control character generation" aspect of the block 174 is an encoder which is used to generate the five control codes FID, EOF, CR, EPF–1 and EPF–2.

The field identifier character FID of the new field is now inserted into its proper sequence by a control signal from the input/output control 150 to the control character generation 174 causing the FID code again to be encoded and transferred into the memory buffer register 154 via transfer gates 176.

The memory buffer register 154 is a 7-bit register used in the keyboard mode as a buffer register, and in the transmit mode when data is being sent to the data processor as an output register. The memory buffer register 154 is capable of transferring data to the memory input gates 138 in parallel or, in the output mode, it can transfer data in serial fashion to the I/O control 178.

Following the transfer of the field identifier code FID into the memory buffer register 154, an end-of-field character is generated by the control character generation in block 174 upon the transmission of a control signal from the input/output control 150 to the block 174, and then transferred into the display register 128 via the transfer gates 130. Now, at this point in time there will be a field identifier code FID in memory buffer register 154, a rank character in memory buffer register 134, an end-of-field character in the display register 128 and the field identifier character FID of the existing field in the memory information register 126. Thus, it now appears that the first three characters of the new field are now inserted in their proper sequence in front of the existing field identifier FID for sequential loading into the memory 100.

The new data have taken their positions in the several registers 128, 134 and 154 on the first portion of the memory cycle in which the existing field identifier code FID was read from the memory into the memory information register 126. On the write portion of this cycle, the data in memory buffer register 154, which is a field identifier character FID, is written, via the memory input gates 138 and the information drivers, into the memory cell from which the existing field identifier FID was read out into the memory information register 126. The display cycle is again enabled by the memory control 124 and the memory address register 122 is now counted up by one count to present the next address to the memory 100. On the first portion of the next memory cycle, the data in memory buffer register 134 is transferred into memory buffer register 154 via the transfer gates 176, the data in the display register 128 is transferred into the memory buffer register 134 via the transfer gates 136, the data in memory information register 126 is transferred into the display register 128 via the transfer gates 130, and the data in the new address, or memory cell of the memory 100 read into the memory information register 126. Again on the write portion of this memory cycle the data in the memory buffer register 154 will be written into memory 100 via the memory information gates. The memory address register 122 is again counted up by one count to present the next address to the memory 100, for readout of this next address, and the information in the several registers shifted downward, as described previously. This process is repeated until the entire memory 100 has been completely cycled once, at which time the load cycle and push cycle are complete. The horizontal position counter 114 will be recycled back to the leftmost portion of the screen corresponding to margin position MP–1, and upon decoding the state of the last address of the memory address register 122, the vertical position counter 118 will be recycled to its first position corresponding the first or top line on the screen.

The existing field which was assumed to be an initial Query field on the top line of the screen 104 has now been pushed forward in memory so that when it is displayed on the screen 104 it will appear to have been pushed down on the screen and the new field of information inserted above it. The new field will thus have an FID code stored in the first memory address or cell M–1, a rank character stored in memory cell M–2 and an end-of field character stored in memory cell M–3, and with the cursor 142 embracing or bracketing the end-of-field character.

It will be recalled that the description for loading the initial Query field into the memory was deferred until a later time. This description will now be given.

The initial Query field is written into the first three locations of memory (after depression of the CLEAR key, or by the initial power turn-on) by detecting the fact that the memory 100 has been cycled at least once. As soon as the memory 100 has cycled through all memory locations a pulse is generated which simulates the operator depressing the field identifier key for the Query field.

The field identifier code FID is placed in the memory buffer register 154, as described previously, the rank character is transferred into memory buffer register 134 and the end-of-field character EPF–1 for the initial state Query field placed into the display register 128, also as described previously. The push cycle is then enabled to similarly transfer the information into the memory 100 by pushing the memory forward by three memory cells. That is, if there had been data in the first three cells M–1 to M–3, this data would now appear in memory cells M–4 to M–6 and with the initial field identifier character FID in memory cell M–1, its rank character in memory cell M–2 and its end-of-field character EPR–1, corresponding to the delta in memory cell M–3. The result of pushing the codes in memory forward by three places is that the last three codes in memory are lost.

Figure 5A:
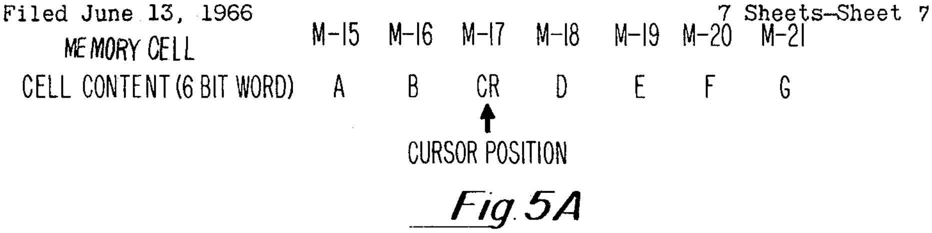
FIG. 5A illustrates, diagrammatically, a group of memory cells each represented as storing an illustrative six-bit word.
Figure 5B:
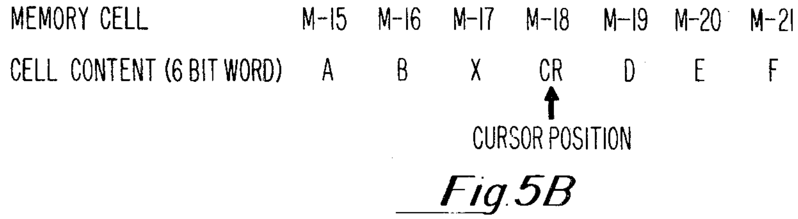
Figure 5C:
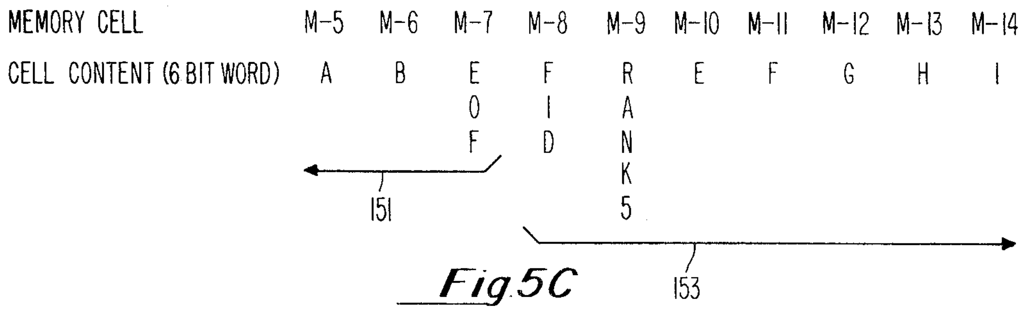
Figure 5D:
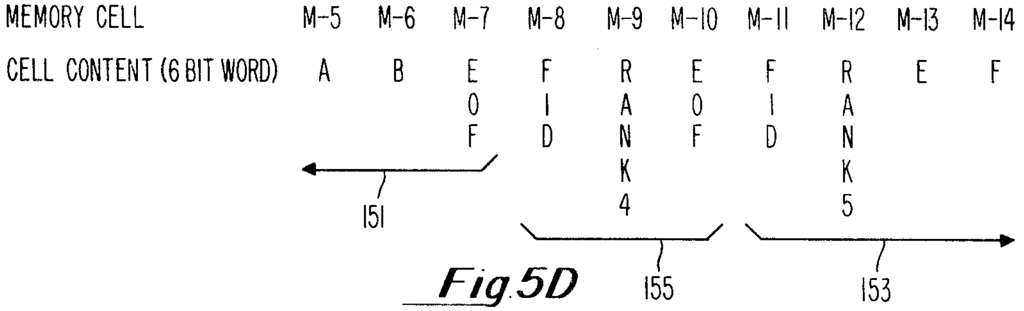

FIG. 5C illustrates diagrammatically a similar type of push cycle in which an arbitrarily chosen group of memory cells M–5 to M–14 are each storing a six-bit word and represent data in two existing fields of information 151 and 153, both of which, for purposes of illustration, are only shown partially. FIG. 5D shows the result of loading a new field identifier and end-of-field group 155 between the two existing fields 151 and 153 of FIG. 5C. Thus the new group 155 has been inserted in front of the field identifier FID of FIG. 5C so that the character code of this field identifier and all character codes which follow it in memory are pushed forward in memory by three places or memory cells, so that the last three character codes in memory cells M–1022, M–1023 and M–1024 are lost, as indicated previously.

The invention is also capable of providing a line spacing between fields. In the present embodiment, an extra line spacing is provided between the last field displayed and the first Query field on the screen. As each display cycle is started, a search is made for the first Query field rank character which is read out of memory. When the rank character is detected of the first Query field out of memory, which will always be the initial Query field, a control flip-flop is set which causes an extra count to the vertical position counter before the rank display cycle. This count will cause a one-line space between the initial Query field and the previous field. If the initial Query field is the first field out of memory, this control flip-flop is not set, and therefore the extra count is not generated. The cursor vertical position counter is also counted up when an extra count is generated to keep the correct cursor relationship. The cursor vertical position counter is then counted down at the end of the display frame to allow the proper relationship for the beginning of the next frame, the word "frame" meaning a complete screen 104 display.

The discussion thus far has been directed to the method of loading a two-character field identifier sequence together with its end-of-field character, and, in a general way, to the positioning of the cursor 142 over the end-of-field character. Normally, the next operation to be performed is to load the individual data characters into the fields in order to compose a message. This function is initiated by the operator depressing the appropriate alphanumeric key on the keyboard. The data character is encoded in the encoder 158 and transferred into the first character position CP–1 of the input data register 152 via the input selection gates 160, the input buffer register 162 and the input transfer gates 164. Once the data is in the input data register 152, the system must now look for the position in memory to load the data. The data in this case is always loaded at the position where the cursor 142 is located, in fact, that is the purpose of the cursor—to indicate to the operator where the new data will be inserted.

Loading in a new data character involves one of two operations, either an insert operation which involves a push cycle, or an operation in which the new character merely replaces an existing character, in which case no push cycle is required. The insert operation will be discussed first.

In the insert operation, the new data character may be inserted between a control character, such as carriage return and end-of-field, and the data character prior to it. Since the insertion operations are similar, only the operation for inserting a character between an end-of-field character and the last character in the field prior to it will be given.

In the case where the first data character is being loaded into the field, it will be inserted between the end-of-field character of the field and the rank character in memory. Display-wise, when the display is later presented to the cathode ray tube 102, the new character will appear to have been inserted between the end-of-field character, which will be a delta in the case of a Query field, and the upwardly-pointing arrow 143 in margin position MP–2 which indicates the unacknowledged status of the field. Therefore, since the new data character is to be inserted at the place where the cursor 142 is located, a search must be made to locate the position of the cursor.

The display cycles start again and, as discussed before, there is no display presented to the cathode ray tube during this loading function. As the memory 100 is cycled, the horizontal position counter 114 is counted up by one count at the commencement of each memory cycle until it is reset at the 50th data position of the screen, which is data position DP–50, back to data position DP–1. As the horizontal position counter 114 recycles back to its first data position, it generates a signal which is transmitted to the memory control 124, and the memory control will transmit a signal to the vertical position counter 118 to count it up by one count, thereby placing it in a state corresponding to the next line down on the screen. These cycles are repeated until a position is reached at which the position comparator 148 indicates, by a signal to the memory control 124, that the horizontal position counters 114 and 144 are equal, and that the vertical position counters 118 and 146 are equal. This indicates that the end-of-field character which is now in the display register 128 was read out of the memory cell in the memory 100 which corresponds to the position where the cursor 142 is located and at which the cursor 142 would be displayed if the display were presented to the cathode ray tube 102.

The insert loading function is now somewhat similar to that described previously for the field identifier load in that it involves a push cycle, however, the transfer paths and operation are somewhat different. In this case, the end-of-field character in the display register is transferred back into the memory 100 on the write portion of the cycle by being transferred directly from the display register 128 into the memory input gates 138 and then to the memory 100 via the information drivers. On the next memory cycle the display cycle is stopped and the memory address register 122 is not counted, so that the end-of-field character in the same memory cell is read out for the second time and stored in the memory information register 126. At the same time, the new data character is transferred from the input data register 152 into the display register 128 via the input data gates 174 and the transfer gates 130. On the write portion of this memory cycle the new data character, which is now in the display register, will be transferred from the display register directly to the memory input gates 138 and then into the interrogated memory cell via the information drivers. As each new subsequent memory cycle and display cycle begin, the memory address register 122 is counted up by one count, the information in the next memory cell read into the memory information register 126 and the information in the memory information register 126 transferred into the display register 128. On the write portion of the memory cycle, the information is transferred from the display register 128 directly back into memory via the memory input gates 138 and information drivers. The process is repeated until the entire memory 100 has been cycled once, thereby resulting in a push cycle which advances or pushes the data in memory one address or one memory cell forward, beginning with the memory cell at the place where the cursor 142 was located.

As indicated earlier, the insert operation for loading a new data character in front of a carriage return control character is similar to that just described for loading in front of an end-of-field character. FIG. 5A illustrates diagrammatically an arbitrarily chosen group of memory cells M–15 to M–21 each storing a six-bit word. FIG. 5B shows the result of loading the character "X" in front of the carriage return code CR of FIG. 5A. The carriage return code CR and all character codes which follow it in memory are pushed forward by one address or memory cell.

Now in the case of a replace operation, in which the operator wants to correct or replace an existing character with a new character, the operation is simply one of overwriting the old character so that the new character is in its place. This operation does not involve a push cycle.

The replace function is initiated by the operator depressing a cursor control key on the keyboard to position the cursor 142 at the location on the screen 104 where the existing character is to be replaced. The correct data character is entered into the input data register 152, as previously, by depressing the appropriate alphanumeric key on the keyboard. A display cycle is started, also without the presentation of any display to the cathode ray tube 102, and the data in the first memory cell read out into the memory information register 126 and transferred into the display register 128. Again, the problem is to find the place where the horizontal position counters 114 and 144 are equal and where the vertical position counters 118 and 146 are equal. On the write portion of this cycle, the data in the display register 128 is again transferred directly to the memory input gates 138 and then back into its location in memory via the information drivers. The memory address register 122 is then counted up by one count, and the horizontal position counter 114 also counted up by one count, and this sequence is repeated, as previously, until the position comparator 148 indicates to the memory control 124 by an output signal that the horizontal position counters 114 and 144 are equal, and that the vertical position counters 118 and 146 are equal. This again establishes the fact that the memory cell in the memory 100, out of which the data in the display register 128 was read, is at a position corresponding to the location of the cursor 142. On the write portion of this cycle, the data in the display register is transferred directly to the memory input gates 138 and then back into its memory location via the information drivers. The display cycle is now again stopped and the memory address register 122 again not counted up, so that the data in the memory cell which is to be replaced is now going to be read out for the second time. Accordingly, this data is read out into the memory information register 126 and the new data transferred from the input data register 152 into the display register 128 via the input data gates 174 and the transfer gates 130. On the write portion of this cycle, the new character is transferred from the display register 128 directly into the memory input gates 138 and then into the interrogated memory cell via the information drivers. This completes the loading cycle for the replace function, since no push cycle is required in this case, and the display cycle is then again enabled.

Each time that a new data character is inserted into a field, whether it be to replace a character or as an insert, the input/output control 150 will generate a signal to the cursor position control 170 to cause it to count the cursor horizontal position counter 144 up by one count, so that the cursor 142 will move in stepwise typewriter fashion across the screen to the next data position on the screen.

When the cursor horizontal position counter 144 attains a state corresponding to data position DP–50, the end-of-field character and the cursor will be at the last data position of the screen, data position DP–50. If a new data character is inserted at this time, it will be inserted between the end-of-field character and the last data character of the field which is prior to it, and this will result in the end-of-field character and cursor 142 being pushed ahead to the first data position DP–1 of the next line below. This is initiated when the horizontal position counter 114 generates a signal to the memory control 124 indicating that it is recycling back to the first data position DP–1, whereupon the memory control 124 will transmit a control signal to the cursor position control 170 indicating that the end of a line has been reached and causing the cursor position control 170 to preset the cursor horizontal position counter 144 to the state corresponding to data position DP–1. This establishes the horizontal location of the cursor 142. In order to place the cursor 142 at the proper vertical position, which in this case is the next line down, the cursor position control 170 will transmit a control signal to the cursor vertical position counter 146 causing it to be counted up by one count. This will cause the cursor 142 to be moved down on the screen 104 to the next line. At this point, the end-of-field character will be at data position DP–1 of the next line down on the screen, and it will be bracketed by the cursor 142.

In order to prevent the overflow of information on the screen 104 and to confine the agent or operator to loading data within predetermined limits, an end-of-page function is provided. Thus, if the delta of the initial state Query field reaches the last data position DP–50 of a predetermined line, which is the 37th line in this embodiment, creation of new lines will be inhibited and all field identifier keys except that for the Query field will become inoperative. This is accomplished when the delta 147 is displayed and detected on the 37th line or any line below it by an end-of-page detection circuit 180. The controls which normally allow insertion of data, such as the line insert key and cursor DOWN key, which will be described later on, are inhibited by the circuit 180, as are also all new field identifier keys.

When only a predetermined number of characters may still be written on the screen, which in the present embodiment is 154 characters, this will be detected by the circuit 180 and the cursor 142 will automatically be positioned to the beginning of the initial state Query field, and all field identifier keys except that for the Query field will become inoperative. This is accomplished by the circuit 180 inhibiting the field identifier keys so that, if depressed, they cannot enable the encoder. 158.

If either one or both of these situations occur, that is, the 37th line feature and the 154 character feature, message compositions in the initial state Query field will be limited to adding characters to existing lines in the field, until either only a predetermned number of characters may be written or the delta 147 reaches a predetermined position, which in this embodiment are, respectively, 102 characters and the 49th data position DP–49. In the event that only 102 characters may be written, or in the event that the delta reaches data position DP–49, and an attempt is made to write an additional character, the cursor 142 will be positioned back to the beginning of the initial Query field.

Another feature of the invention is its capacity to enable a display on the cathode ray tube screen 104 to be corrected or otherwise edited without rewriting the other parts of the display. Thus by positioning the cursor 142, a character may be replaced or a new character inserted, as discussed previously. Additional functions which involve use of the cursor 142 are line erase and line insert functions. These, and the replace and insert functions, are accomplished by positioning the cursor 142 individually with the appropriate one of the UP, DOWN, FORWARD, BACK and TAB keys and by supplementing it with a line insert key and line erase key whenever the line insert and line erase functions are performed. The various controls for positioning the cursor 142 within a field in connection with the several keys will now be discussed.

The UP, FORWARD and BACK cursor keys are two-level keys. Normal depression of these keys to the first level causes a single action, while further depression to the second level causes the action to be repeated 10 times per second, as determined by a 10-cycle per second oscillator 157. Basically, this is accomplished by duplicating the function in the encoder 158, the same as though the key were repeatedly depressed. Each time a particular control key is depressed for positioning the cursor 142, or in connection with cursor positioning movements whenever the line insert key or the line erase key is depressed, it will be encoded by the encoder 158, and the encoded data will be transferred into the first character position CP–1 of the input data register 152 via the input selection gates 160, the input buffer register 162, and the input transfer gates 164 and presented to a cursor control decoder 182 where it will be decoded and presented as one of seven outputs to the cursor position control 170. The cursor control decoder 182 consists of a six-bit decoder which decodes to the seven controls including the line insert, the line erase and the five cursor controls, and also decodes the HARD COPY input which is not involved in positioning movement of the cursor.

When the UP key is depressed, the function to be performed is to move the cursor 142 to the first data position DP–1 of the line above. Depressing this key sets a control flip-flop in the cursor position control 170 to enable the UP function and this flip-flop remains set until the function is terminated. As the display cycle runs, a search is made to determine the status of equality of the vertical position counters 118 and 146. When these counters are equal, the position comparator 148 will generate a signal to the memory control 124 indicating that the vertical position counters 118 and 146 are equal and the memory control 124 will in turn, through the cursor position control 170, cause the cursor vertical position counter 146 to be counted down by one count and the cursor horizontal position counter 144 to be preset to data position DP–1 of the next line above. The reason that the cursor vertical position counter 146 is counted down in the UP function is that normally it is counted up as it steps down on the screen 104. At the termination of the UP function, the cursor 142 will be at data position DP–1 on the line above.

Now if the cursor 142 happened to be in the first line of a field at the time the UP key was depressed, as the display cycle runs, the field identifier character FID for the field will be detected in the display register 128, indicating that this is the first line of a field, and a control flip-flop will be set in the cursor position control 170 to indicate that the cursor 142 is already in the first line of a field and to inhibit the UP function. Whenever the end of the first line is reached, which may be either data position DP–50, or a position where a carriage return CR or an end-of-field character is positioned, the flip-flop is reset when the carriage return is effected which now indicates that this is not the first line of a field and enables the UP function because the cursor 142 will now be positioned to the second line of the field.

Now if the UP key is depressed to its second level, the UP function will be repeated at a rate of 10 times per second. If the key is kept depressed to the second level after the cursor 142 has reached the first line of the field, the function will keep terminating but without down-counting the cursor vertical position counter 146 so that the cursor 142 will remain in the same data position DP–1 of the first line of the field.

When the DOWN key is depressed, the function to be performed is to move the cursor 142 to the first data position WP–1 of the next line down. Depression of this key sets a control flip-flop in the cursor position control 170 which enables the down function and remains set until the function is terminated. As the display cycle runs, a search is again made to determine the equality status of the vertical position counters 118 and 146. If these counters are equal, the position comparator 148 will similarly generate a signal, as when performing the up function, and through the memory control 124 and cursor position control 170 cause the cursor vertical position counter 146 to be counted up and the cursor horizontal position counter 144 to be reset to data position DP–1. This will place the cursor 142 in the first data position DP–1 in the next line down.

If the cursor 142 happens to be in the last line of a field at the time that the DOWN key is depressed, as determined by the setting of a control flip-flop in the cursor position control 170 and which will remain set until the cursor 142 moves out of the last line of the field, then in this case a new line must be generated for the field. As the display cycle runs, this is accomplished by inserting a carriage return code CR between the end-of-field character and the last character in the field, and is performed by the depression of the DOWN key which also serves to simulate a keyboard entry for carriage return, so that the carriage return code CR is generated in the control character generation block 174 and loaded into memory in a manner described previously. The cursor horizontal position counter 144 will be preset to data position DP–1 and the cursor vertical position counter 146 will be counted up by one count. This will position the cursor 142 to the first data position DP–1 of the next line down, which is the new line.

Figure 4E:
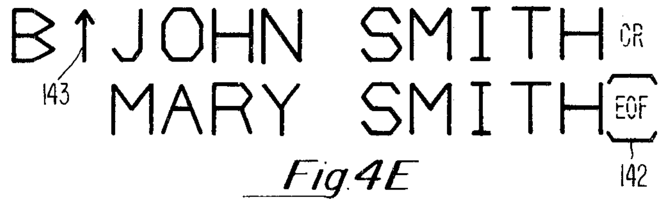
Figure 4F:
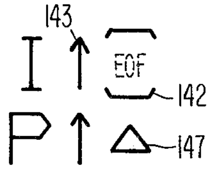
Figure 4G:
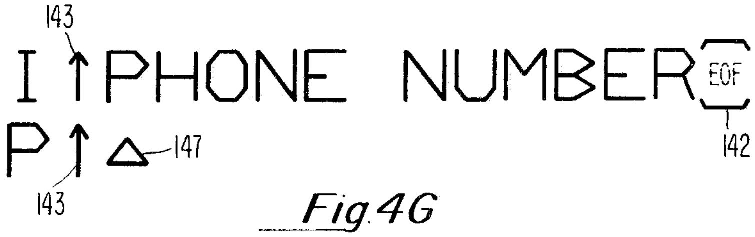
Figure 4H:
Figure 4J:
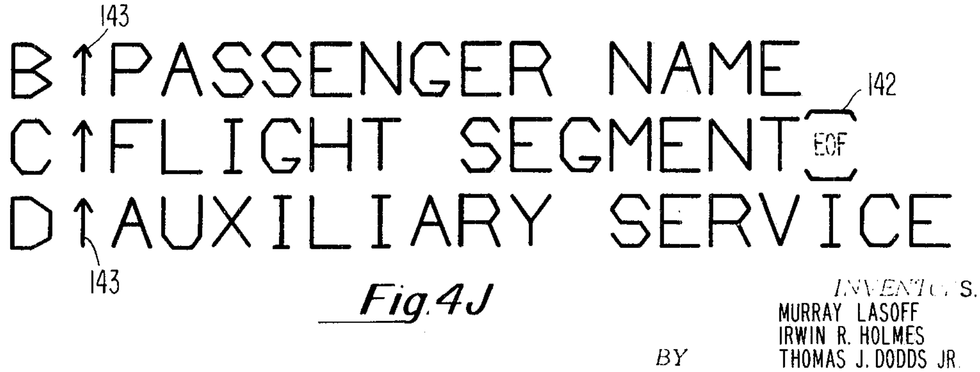

FIG. 4E shows a field with two lines of data in which the top line, or first line in the field, was the only, or last, line in the field at the time that the DOWN key was depressed. The cariage return code letters CR are shown dotted, similar to the end-of-field letters EOF, to indicate that the carriage return code is also not displayed. When the DOWN key was depressed, the end-of-field code EOF and the cursor 142 were placed in the position, on the next line down, now occupied by the letter M in the name MARY in FIG. 4E. When the full name MARY SMITH was entered, the cursor 142 and the end-of-field character EOF were stepped rightwardly to the position shown.

When the FORWARD key is depressed the function to be performed is to move the cursor 142 one position to the right for each depression of the key. This function is performed similarly to those for the up and down movements of the cursor. When the FORWARD key is depressed, a control flip-flop in the cursor position control 170 is set to enable the function and remains set until it is terminated. As the display cycle runs, a search is again made to determine the equality status of the vertical position counters 118 and 146. When these counters are found to be equal, and if the cursor 142 is in the medial portion of a line and the next character is a data character, the cursor horizontal position counter 144 will be counted up by one count and the cursor 142 advanced one position to the right. If the cursor 142 reaches a carriage return position and brackets a carriage return character CR, the cursor horizontal position counter 144 will be reset to the first data position DP–1, the cursor vertical position counter 146 will be counted up by one count and the cursor 142 will then be positioned in the first data position DP–1 of the next line down.

If the cursor 142 is in the last data position of a line DP–50 when the FORWARD key is depressed, the cursor horizontal position counter 144 will be reset, the cursor vertical position counter 146 will be counted up by one count and the cursor 142 in this case also position in data position DP–1 of the next line down.

If the cursor 142 is positioned to the last character of a field when the FORWARD key is depressed, the forward function will be terminated since the cursor 142 must remain within the field. In this case then, the cursor 142 will remain positioned to the last character of the field Depression of the FORWARD key to its second level will cause the cursor 142 to be stepped rightwardly across the screen 104 in typewriter fashion at the rate of 10 steps per second until the end of the field is reached. At this point, the forward function is terminated so that the cursor 142 will remain at the data position where the end-of-field character is located.

The operation of the BACK key is similar to that of the others. A control flip-flop is first set in the cursor position control 170 to enable this function and remains set until it is terminated. As the display cycle runs, a search is again made to determine the equality status of the vertical position counters 118 and 146, as previously. If these counters are equal, as again determined by the position comparator 148, the cursor horizontal position counter 144 will be counted down by one count thereby positioning the cursor 142 to the next data position to the left. If the cursor 142 reaches the first data position DP–1, it will operate like the UP key. That is, for each depression of the BACK key the cursor 142 will move up to the next line. This is accomplished by detecting the fact that the cursor horizontal position counter 144 has been down-counted to data position DP–1, at which place the down-count pulse sets the control flip-flop in the cursor position control 170 for the UP function. After that, the sequence of events is the same as that in performing the UP function so that upon repeated depressions of the BACK key the cursor 142 will eventually be positioned to the first data position DP–1 in the top line of the field.

Depressing the BACK key to its second level will cause the cursor 142 to be stepped back at a rate of 10 data positions per second until it reaches the first data position DP–1 after which it will move upwardly to the first data position DP–1 in the first line of the field, at which time the function will terminate.

Depression of the TAB key causes the cursor 142 to move to the last character position in the field. This is accomplished by first setting a control flip-flop in the cursor position control 170 to enable the TAB function and which will remain set until the function is terminated. As the display cycle runs, a search is again initiated to determine the equality status of the vertical position counters 118 and 146. When these counters are equal, the count pulses to the horizontal position counter 114 and the cursor horizontal position counter 144 will be the same, so that the cursor horizontal position counter 144 will be counted up along with the horizontal position counter 114 at the same frequency of the count pulses until the end-of-field is detected. This terminates the TAB function and with the cursor 142 now positioned at the character position where the end-of-field character is located.

In order to erase all data characters in a line from the cursor 142 to the end of the line, the cursor 142 is first positioned to the desired location in the line and then the line erase key is depressed. This will set all the data characters of the line that the cursor 142 is positioned on to the space codes, except those data characters in the line to the left of the cursor. This is accomplished by again setting a control flip-flop in the cursor position control 170 to enable the line erase function and which will remain set until this function is terminated. As the display cycle runs, a search is again initiated but this time to determine the equality status of both the horizontal position counters 114 and 144 and the vertical position counters 118 and 146. When these counters are found to be equal, a control flip-flop is set in the memory control 124 which causes the character code for a space to be inserted into the memory input gates 138. Thus, as the character codes in the memory 100 corresponding to the data characters to be erased are read out, a series of space codes will be written back into the memory 100 from the memory input gates 138, and the control flip-flop will remain set until the end of the line is detected. All data characters from the position that the cursor 142 is positioned at to the end of the line will be erased, and the cursor will remain in the location to which it was positioned.

In order to insert a new line, the cursor 142 is first positioned on the line where the new line is to be located and then the line insert key is depressed. This causes the line that the cursor 142 is positioned on and all lines below it to be pushed down one line, thus creating a new line. The cursor 142 is then positioned to the first data position DP–1 of this new line. If the cursor 142 is positioned on the first line of a field, the field identifier is not pushed down.

Upon the depression of the line insert key, a control flip-flop is again set in the cursor position control 170 to enable the function and which will remain set until the function is terminated. As the display cycle runs, a search is again made to determine the equality status of the vertical position counters 118 and 146. When these counters are equal, the cursor horizontal position counter 144 is reset and a carriage return code is generated in the input section in the control character generation block 174 and loaded into the memoy 100 in the same manner that a carriage return code CR is located when the DOWN key is depressed. This carriage return character CR is then inserted at the position specified by the cursor horizontal position counter 144 and the cursor vertical position counter 146, and this will cause all lines, with the exception of the field identifier, to be pushed down one line. The field identifier will remain in the line it previously occupied, however, its data will move down one line.

Whenever the HARD COPY key is depressed, the character encoded by the encoder 158 will be presented to the cursor control decoder 182 via the input selection gate 160, the input buffer register 162, the input transfer gates 164 and the input data register 152. The decoder 182 will decode this character and present the decode to the input/output control 150.

Thus, upon depression of the HARD COPY key a control flip-flop is set in the input/output control 150 and will remain set until the first transmission to the data processor. The information contained in this control flip-flop is transferred as the $b_3$ bit in the message variant code MV, at which time the information is not reset but is stored until a response is received from the data processor, as will be explained later on. The object is not resetting the $b_3$ bit is that in case of retransmission to the data processor is required, the hard copy information will again be available to be transmitted.

Depression of the HARD COPY key will also cause the end-of-field character of the Query field, which is initially displayed as a delta 147 (FIG. 4A), to be displayed as an inverted delta 149 (FIG. 4B), thereby providing a screen display to the operator to indicate that the hard copy option had been selected. The character code for the inverted delta 149 is generated in the control character generation portion of the block 174 upon receiving a signal from the input/output control 150 to generate this control character, and then is loaded into memory 100 by having it replace the character code for the regular initial state delta 147. Display of the inverted delta 149 on the screen 104 is accomplished by detecting the character code for the inverted delta in the display register 128 as it is being presented during the display cycle to the cathode ray tube for display of the delta.

Depressing the CLEAR key causes the agent set to be placed in its initial state and the same function to be performed as when the POWER ON CLEAR signal was generated. Depressing the CLEAR key also causes a flip-flop to be set in the input/output control 150 and which will remain set until the memory 100 is cycled and cleared, and all words or character codes written to the all ONES condition, according to the logic chosen in this embodiment. As soon as the memory 100 has cycled through all memory locations, a pulse is generated which simulates the operator depressing the field identifier key for the Query field, so that the initial Query field will now be loaded in to the first memory cells of the memory 100 and displayed on the screen 104 in the top line.

When the operator has the information in the fields on the screen 104 and has made any necessary changes or corrections, normally the next operation is to transmit the information to the data processor 184 (FIG 3) via one of the two remote scanner controllers 186. It will be recalled that in the early part of this description it was stated that when a function key is depressed, a request for service is generated to both remote scanner controllers and that when one of the remote scanner controllers grants service, that the agent set, identified in FIG. 3 by the reference character 188, removes its request for service from the other remote scanner controller. As illustrated in FIG. 3, the agent sets 188 are capable of transmitting and receiving data from either remote scanner controller 186, and the remote scanner controllers 186 are connected to the data processor 184 for the exchange of information by means of the telephone utility company Modulator-Domodulator units 190 and the telephone lines 192.

Transmission of the information to the remote scanner controllers 186 is initiated by depressing the appropriate function key on the keyboard. This serves to lock the keyboard, which remains locked during the transmit function, and generates an output request signal in the input/output control 150 which is transmitted to the remote scanner controllers 186 via the I/O control 178. Depressing the function key also causes the function code FC, or character code (FIG. 2) corresponding to the assigned letter for the function, to be encoded in the encoder 158 and sets a control flip-flop in the input/output control 150, representing one of the four control codes derived from the two bits out of the encoder 158, and which remains set until the transmit function is terminated. The encoded character code for the function is transferred from the encoder 158 to the first character position CP–1 of the input data register 152 via the input selection gates 160, the input buffer register 162, and the input transfer gates 164.

In the present embodiment of the invention, the assigned letter for the various functions (Table III) has been chosen to be displayed on the screen 104 as the next to last character in the Query field. Therefore the letter for the function code is to be placed in the character position on the screen 104 previous to the delta 147 of the initial Query field. Consequently, a search must now be initiated in the memory 100 to find the first end-of-field character EPF–1 of the Query field in order to insert the function character code in front of it.

Now as the search commences and the display cycle runs as previously, the display is again not presented to the cathode ray tube 102. When the end-of-field character EPF–1 is detected in the display register 128 by the memory control 124, a load cycle and a push cycle are initiated and the function code character is now in the input data register 152 is loaded into the memory 100 in front of the end-of-field character EPF–1, and the ensuing single push cycle will advance the end-of-field character EPF–1 to the next memory cell so that the initial delta 147 will move one character position to the right on the screen 104. When the push cycle has proceeded to the end of the memory 100, the maximum address of the memory address register 122 is decoded and the load cycle terminated.

Now, after a load cycle, the next operation, usually, is to reset the input data register 152. However, in this case the input data register 152 is not reset but continues to store the function code FC.

Upon receipt of a XMIT ACKNOWLEDGE signal by the I/O control 178 from the remote scanner controller 186 which granted service, indicating that it is ready to receive data, the agent set, in the illustrative mode of operation, will first transmit two control characters to the data processor 184, via the remote scanner controller 186, however, this method of transmitting is not limiting, but merely illustrative of one mode of transmission. These two control characters are the message variant character MV and the function code FC which is still stored in the input data register 152. In accordance with the illustrative embodiment, the character to be transmitted first has been chosen to be the message variant MV. It will be recalled that the message variant character MV contains three control bits which determine whether the agent set 188 has been cleared since the previous transmission to the data processor 184, or whether the present transmission is a retransmission of a previously transmitted message, or whether the hard copy option has been selected.

The message variant character MV, which has been stored in the input/output control 150, is now transferred into the memory buffer register 154 which is also capable of functioning as an output register, as indicated in block 154. The function code FC is next transferred from the input data register 152 into the memory buffer register 134.

The display cycle runs and a search is now made for the first unacknowledged field in the process of transmitting the fields to the data processor 184. This unacknowledged field will be detected by decoding the rank character of the two-character field identifier sequence when it is read out of memory and transferred into the display register 128 via the memory information register 126 and transfer gates 130. Since the rank character in the display register 128 is the second character of the two-character sequence, the first character FID having been written back into its memory location on the previous write cycle, the first character, or field identifier code FID, will have to be reread out of memory and placed so that it will be transmitted in its proper sequence, ahead of the rank character.

This is accomplished by first writing the rank character back into memory from the display register 128 via the memory input gates 138 and information drivers. The memory address register 122 is then counted down by one count and the field identifier code FID in the previous memory location reread into the display register 128, and detected by the search controls in the memory control 124 to signify that there is no more room in the display register 128, or in the memory buffer register 134 or in the memory buffer register 154 until some data is transmitted to the remote scanner controller 186. These three registers 128, 134 and 154 are controlled so that if the memory buffer register 154 is empty, and there is information in memory buffer register 134, the latter information will be transferred to memory buffer register 154. If memory buffer register 134 is empty and the display register 128 contains data, the data will be transferred to memory buffer register 134. These transfers are enabled by a control flip-flop in the memory control 124 which is set whenever a field identifier code FID appears in the display register 128 as the first character in a field to be transmitted. This flip-flop serves to keep the field identifier code FID in the display register 128 until the search cycle is completed, at which time it is reset to permit transfer of the FID code from the display register 128 into the memory buffer register 134.

Upon the receipt of shift pulses from the remote scanner controller 186, the agent set 188 serially transmits the data from memory buffer register 154 to the output data lines leading to the I/O control 178, to be transmitted to the remote scanner controller 186. As this data is being transferred to the remote scanner controller 186, a parity generator 193 detects the serial parity bit of the data as the data goes out and generates the parity to the I/O control 178. This bit is the seventh bit in the memory buffer register 154, and each time that information is transferred into this buffer register, a parity bit is always transferred into the seventh position so that as this bit runs down through the register, as the information is being shifted out, there will always be at least one "1" in the register even though in some cases an all "0" code may be in the process of being transmitted to the remote scanner controller 186. When that indicator bit reaches the end of the output register or buffer register 154, that event indicates that the rest of the register contains all "0s." This indicates that the output register 154 is now empty and will receive new data from the memory buffer register 134. The data in memory buffer register 134 will then be transferred into the output register 154 via the transfer gates 176 and since the memory buffer register 134 will then be empty, the data in the display register 128 will be transferred into the memory buffer register 134 via the transfer gates 136. As each character is transferred from the display register 128 into the memory buffer register 134, it is also written back into its memory location in the memory 100 via the memory input gates 138. On the next memory cycle, the memory address register 122 is counted up by one count and the rank character read out and transferred into the display register 128 into its proper position via the memory information register 126 and transfer gates 130.

The transmit cycles continue until all the information in the unacknowledged fields is transferred to the data processor 184. Since the initial Query field is always the last unacknowledged field on the screen, the transmit function is terminated when the end-of-field code EPF–1 of the initial Query field is detected. This locks the keyboard and places the agent set 188 in the receive mode.

Another feature of the invention is its capacity to enable the operator to inform the data processor 184 to ignore some transmission or to redisplay a particular message. For example, a redisplay message might involve a passenger's name record (PNR) in connection with an aircraft flight schedule. These two functions, the ignore function and the redisplay function, are listed in Table III.

Whenever either the ignore function key or redisplay function key is depressed, a normal type of transmission is initiated, similar to that previously described, in which the function code FC is inserted between the end-of-field character EPF-1 of the Query field and the character previous to it, as described previously. When the transmission is started, the message variant MV is again transferred into the output register 154 and the function code FC again transferred from the input data register 152 into the memory buffer register 134. The display cycle runs and a search cycle is again made for the first unacknowledged field. However, since in this case it is required that only two character codes be transmitted to the remote scanner controller 186, which are the message variant code MV and the function code FC, all other characters will be prevented from being transmitted. This is accomplished by inhibiting the detection unit in the memory control 124 which normally detects the unacknowledged field identifier rank character in the display register 128, so that even though the search proceeds to the end of the memory 100, no unacknowledged field identifiers will be found and the transmit operation will be terminated. Thus, whenever an ignore or a redisplay function is selected, there will only be a two-character sequence transmitted to the remote scanner controller 186.

The invention also provides the feature of automatically retransmitting a message and of enabling the operator to retransmit a message in the event that no response is received from the data processor 184 within a predetermined time. The method of performing this retransmit feature will now be described.

Whenever the operator first presses a function key to initiate transmission to the data processor 184, the timer 156 is set and the agent set 188 placed in the receive mode of operation. If a response is not received from the data processor 184 when the timer 156 has timed out, the message will be automatically retransmitted to the data processor 184 and the timer 156 started for a second time. If a response is not received from the data processor 184 after the timer 156 has timed out for the second time, the agent set 188 will provide a sensible indication to the operator, preferably in the form of a retransmit light which will be lit, and a retransmit push-button will be enabled which the operator may depress to again initiate a retransmission and again set the timer 156.

Another feature of the invention resides in the fact that the data processor can load information into the agent set. This method of loading by the data processor will now be discussed.

The data processor 184 communicates with the I/O control 178 through the medium of the remote scanner controller 186. The I/O control 178 consists of a series of control flip-flops used to accept control signals from, and generate control signals to, the remote scanner controller 186 interface. The I/O control 178 also contains the differentiation circuits to differentiate the receive and transmit clock pulses, and generates the shift pulses for both the input register 166 and the output register 154. The signals to the input/output control 150 indicating start of message, end of message and end of field, are detected in the I/O control 178. Another control signal which is generated in the I/O control box 178 is the reset control signal to the input register 166 which is generated each time a new input character is to be loaded into the input register 166. It may be noted at this time that since the agent set 188 is illustrated in this embodiment as being coupled to two remote scanner controllers 186, two identical groups of signal paths 196 and 198 leading to the respective remote scanner controllers 186 are shown leading also to the I/O control 178.

When a RCV ACKNOWLEDGE signal from the remote scanner controller 186 is detected, indicating the beginning of a message, and which is present for the duration of the message, control flip-flops are set in the I/O control 178 which determine that the message is to be loaded into the agent set 188. Upon receipt of a RCV CLOCK signal, which is permitted to shift data into the system by the RCV ACKNOWLEDGE signal, a shift pulse is generated which strobes the data on the DATA line from the remote scanner controller 186 and shifts it into the input register 166. Prior to the time that the first RCV CLOCK signal is received, the input register 166 has been reset, with the exception of the first bit in the register.

As shift clock signals are subsequently received and detected, the data is strobed and placed into the input register 166. When seven bits of data have been strobed into the input register 166, the initial bit which was preset into the register will be in the eighth flip-flop within the register. This flip-flop is used to detect the fact that a complete character is stored within the input register 166 so that this character can now be transferred to the input buffer register 162.

During the sequential transfers of information into the input register 166, a complementary flip-flop in a parity check block 194 is complemented once for each data bit which is in the true state, as the data is loaded into the input register 166. When the seventh bit of data is in the input register 166, the parity flip-flop in block 194 strobed with the end-of-character detection out of the input register 166. If this flip-flop is in the ZERO state, it signifies that a parity error has been detected and the agent set 188 will then provide a parity error signal, preferably in the form of a signal to light a parity error light.

Data transmitted from the data processor 184 to the agent set 188 is in the form of a free-running type of input message which is running at 2.4 kc. in the present illustrative embodiment of the invention. Therefore a bit of information will be received by the agent set 188 every 417 microseconds.

In this particular embodiment of the invention there are seven bits of data including parity for each coded character, so that every 2.9 milliseconds a character is serially transferred into the input register 166. Since in the present embodiment of the invention it takes 4 milliseconds to process a character in the memory 100, the first impression is that there is not sufficient time to keep up with a serial stream of data in the input to the agent set 188. The invention, however, has the capacity to handle this situation by processing the input on a two-character basis, that is, two characters can be loaded into the memory 100 simultaneously in a memory push cycle. Since all input data is preceded by a field identifier, this aspect of loading from the data processor 184 will be discussed first, and this will be followed by a discussion of the two-character load.

The field identifier code FID coming into the input register 166 is detected and the fact of its receipt stored in a flip-flop in the input/output control 150 similar to the keyboard mode of input, and then discarded. The next character of the two-character field identifier sequence to be received in the input register 166 is the rank character, and this character code is again transferred to the first character position CP-1 of the input data register 152. From this point on, the loading operation for the field identifier is identical to that employed in the keyboard mode, and with no display presented to the cathode ray tube 102, so that the two-character field identifier sequence and its accompanying end-of-field character will now be loaded into the memory 100 to be displayed on the screen 104 later on, after the loading operation, as the first three characters in the field.

Turning now to the feature of loading the incoming data on a two-character basis, the first character code transmitted to the input register 166 is transferred into the first character position CP-1 of the input data register 152 and the second character code transmitted to the input register 166 is transferred to the second character position CP–2 of the input data register, both characters being transferred via the input selection gates 160, the input buffer register 162 and the input transfer gates 164. The display cycle runs and a search is now made to locate the end-of-field character which is located at the position where the input character codes are to be inserted.

When the horizontal position counters 114 and 144 are equal, and the vertical position counters 118 and 146 are equal, the end-of-field character will again be in the display register 128 indicating that the cursor 142 is located at the same position as the end-of-field character. The end-of-field character is then transferred from the display register 128 directly to the memory input gates 138 and then back into the memory 100 via the information drivers, the first input character code is transferred from the input data register 152 to the memory buffer register 134 via the input data gates 174 and the transfer gates 136, and the second input character transferred from the input data register 152 to the display register 128 via the input data gates 174 and the transfer gates 130.

The memory address register 122 is now down-counted on the next memory cycle, the information in the previous memory cell is transferred into the memory information register 126 similar to that described in the other push cycles, and the information in the memory buffer register 134 transferred directly into the memory 100 through the memory input gates 138. The memory address register 122 is then counted up on the next cycle, the information in the display register 128 is then transferred to the memory buffer register 134, the information in the memory information register 126 transferred into the display register 128, and the next character in the memory 100 read out into the memory information register 126. On the write portion of the cycle, the information in the memory buffer register 134 is transferred directly into the memory 100 via the memory input gates 138. This process results in the two input characters being loaded into the memory 100 in front of the end-of-field character so that they will be displayed in that order on the cathode ray tube screen 104. The push cycle continues until the memory 100 has been cycled.

It will now be seen that by processing the input characters on a two-character basis the agent set 188 can keep up with the fast stream of data on its input. This is made possible by the fact that the push cycle need only run once through the memory 100, whether it be a one-character load or a two-character load.

As described above, the agent set 188 can load a two-character sequence into the memory 100. However, the input data received from the data processor 184 is not always an even number of characters. In other words, the input message may have an odd number of characters. In this case the agent set must process a single-character type of load operation and still provide enough time to store the incoming data until the process is terminated.

Due to the organization of the input control lines, the last or odd character of the previous field is detected at the same time as the next incoming field identifier FID which is coming in right after it. As soon as the odd character is in the input register 166 it is transferred to the first character position CP–1 of the input data register 152 via the same gates and registers 160, 162 and 164, and a control flip-flop is set which enables a single character load and which is reset when the single character load is terminated. From this point forward, the operation of this single character load is the same as in the keyboard load in that a search is made to determine the position of the cursor 142, and whether the cursor is at the position of an end-of-field character, and also whether to replace the character under the cursor with the incoming odd character or to insert the odd character in front of that character, and then if it is an insert operation to push the memory 100 ahead by one memory cell in a push cycle.

Now in the worst-case situation, which involves the insert operation, it will be recalled that in the present embodiment it takes four milliseconds to run through the entire memory 100 in a push cycle. During this four milliseconds, the field identifier code FID that is coming in is being loaded into the input register 166 so that 2.9 milliseconds from the time that the odd character of the previous field was detected, the field identifier character FID will be present in the input register 166. As discussed previously in connection with the field identifier load, the FID character is discarded and a control flip-flop set in the input/output control 150 which indicates that the next incoming character is the rank character of the two-character field identifier sequence.

The rank character will be present in the input register 5.9 milliseconds from the time the odd-character load was started. The rank character is nevt transferred from the input register 166 into the input buffer register 162 via the input selection gates 160 and at this time the push cycle for loading the odd character of the previous field into the memory should be completed, so that the rank character may now be transferred from the input buffer register 162 into the input data register 152 via the input transfer gates 164. From this point forward, the loading of the two-character field identifier sequence will be performed as described previously, in which the field identifier code FID will be generated in the control charatcer generation 174 and transferred with the rank character, which is now in the input data register 152, in their proper sequence into the memory 100 to complete the second load cycle after the odd character of the previous field was detected.

Since it takes 8.8 milliseconds to transmit three characters into the agent set, and 8.1 milliseconds to accomplish the two push cycles while the three characters are being processed, it has been shown that there is more than the required time available to perform this type of operation.

What is claimed is:

1. A display system comprising a display medium having horizontal and vertical display positions, a storage device having a plurality of storage cells, a source of input data, means for changing said input data into groups of character codes, each group containing data character codes and control character codes, means for loading the character codes of each group individually into a sequence of said storage cells including means for arranging the several sequences of character codes in a predetermined order independent of the order in which input data is introduced into said system, each sequence of storage cells storing a different kind of input data and headed by two field identification character codes for identifying the field on said display medium where symbols corresponding to the associated input data are to be displayed, horizontal position means for establishing the horizontal display positions on said display medium, vertical position means for establishing the vertical display positions on said display medium, symbol generating means responsive to certain of said character codes and to individual signals for generating and displaying visible symbols on said display medium in lines of symbols at symbol positions established by said horizontal position means and said vertical position means and in separately identified fields in a rank on said display medium in accordance with said predetermined order as identified by said field identification character codes, and control means operable in a display cycle of said display system for successively detecting a first control character code in a storage cell in each sequence of storage cells for actuating said horizontal position means and said vertical position means at each detection to establish the position on another line of said display medium to commence displaying symbols on that line.

2. A display system according to claim 1 wherein the

PO-1050
(5/69)

UNITED STATES PATENT OFFICE
CERTIFICATE OF CORRECTION

Patent No. 3,505,665 Dated April 7, 1970

Inventor(s) Murray Lasoff, Irwin R. Holmes and Thomas J. Dodds, Jr

It is certified that error appears in the above-identified patent and that said Letters Patent are hereby corrected as shown below:

Column 8, line 20, after "next" insert --field--. Column 9, line 62, "then" should read --when--. Column 10, line 62, "generator" should read --generation--. Column 13, line 1, after "position" insert --counter--; column 13, line 28, first occurrence of "144" should read --114--. Column 14, line 9, "firt" should read --first--; column 14, line 28, before "rank" insert --field identifier code FID and the second character being the--. Column 18, line 16, after "corresponding" insert --to--. Column 23, line 39, "WP-1" should read --DP-1--. Column 24, line 33, "position" should read --positioned--. Column 25, line 62, "located" should read --loaded--. Column 26, line 10, "is" should read --in--; column 26, line 11, "of" should read --a--; column 26, line 61 "Domodulator" should read --Demodulator--. Column 27, line 22, after "character" insert --which--. Column 30, line 26, after "194" insert --is--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents

[redacted]

tinuing said cycles of operation until said memory has been cycled once.

10. A plurality of display systems according to claim 9 characterized further in that each of said display systems is provided with means for transmitting the character codes stored in said memory to and receiving character code input data from a common data processor, and in the provision of scanning means coupled between said display systems and said data processor for establishing communication and exchange of character code data between said data processor and said display systems.

References Cited

UNITED STATES PATENTS

| | | | |
|---|---|---|---|
| 3,346,853 | 10/1967 | Koster et al. | 340—324.1 |
| 3,351,929 | 11/1967 | Wagner | 340—324.1 |
| 3,364,473 | 1/1968 | Reitz et al. | 340—324.1 |

JOHN W. CALDWELL, Primary Examiner

M. M. CURTIS, Assistant Examiner

U.S. Cl. X. R.

340—153

PO-1050
(5/69)

UNITED STATES PATENT OFFICE
CERTIFICATE OF CORRECTION

Patent No. 3,505,665 Dated April 7, 1970

Inventor(s) Murray Lasoff, Irwin R. Holmes and Thomas J. Dodds, Jr.

It is certified that error appears in the above-identified patent and that said Letters Patent are hereby corrected as shown below:

Column 8, line 20, after "next" insert --field--. Column 9, line 62, "then" should read --when--. Column 10, line 62, "generator" should read --generation--. Column 13, line 1, after "position" insert --counter--; column 13, line 28, first occurrence of "144" should read --114--. Column 14, line 9, "firt" should read --first--; column 14, line 28, before "rank" insert --field identifier code FID and the second character being the--. Column 18, line 16, after "corresponding" insert --to--. Column 23, line 39, "WP-1" should read --DP-1--. Column 24, line 33, "position" should read --positioned--. Column 25, line 62, "located" should read --loaded--. Column 26, line 10, "is" should read --in--; column 26, line 11, "of" should read --a--; column 26, line 61 "Domodulator" should read --Demodulator--. Column 27, line 22, after "character" insert --which--. Column 30, line 26, after "194" insert --is--.

SIGNED AND SEALED
SEP 15 1970

(SEAL)
Attest:

Edward M. Fletcher, Jr.
Attesting Officer

WILLIAM E. SCHUYLER, JR.
Commissioner of Patents